(12) United States Patent
Kuwashiro

(10) Patent No.: US 10,310,240 B2
(45) Date of Patent: Jun. 4, 2019

(54) ZOOM LENS AND IMAGE PICKUP APPARATUS INCLUDING THE SAME

(71) Applicant: CANON KABUSHIKI KAISHA, Tokyo (JP)

(72) Inventor: Shin Kuwashiro, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 151 days.

(21) Appl. No.: 15/346,186

(22) Filed: Nov. 8, 2016

(65) Prior Publication Data

US 2017/0139190 A1    May 18, 2017

(30) Foreign Application Priority Data

Nov. 13, 2015 (JP) ................................. 2015-223150

(51) Int. Cl.
| | |
|---|---|
| *G02B 9/60* | (2006.01) |
| *G02B 15/173* | (2006.01) |
| *G02B 5/00* | (2006.01) |
| *G02B 15/28* | (2006.01) |
| *G02B 27/00* | (2006.01) |

(52) U.S. Cl.
CPC ........... *G02B 15/173* (2013.01); *G02B 5/005* (2013.01); *G02B 15/28* (2013.01); *G02B 27/0025* (2013.01)

(58) Field of Classification Search
CPC .......... G02B 13/02; G02B 9/60; G02B 13/00; G02B 7/10; G02B 9/00; G02B 13/04; G02B 13/06; G02B 13/18; G02B 9/34; G02B 9/12; G02B 9/46; G01J 3/02
See application file for complete search history.

(56) References Cited

U.S. PATENT DOCUMENTS

| | | | | |
|---|---|---|---|---|
| 4,759,619 | A | * 7/1988 | Nakamura | .............. G02B 13/04 359/749 |
| 2008/0304167 | A1 | 12/2008 | Souma | |
| 2013/0010174 | A1* | 1/2013 | Shinohara | .............. G02B 13/18 348/335 |
| 2013/0242142 | A1 | 9/2013 | Matsumura | |
| 2013/0250435 | A1* | 9/2013 | Hagiwara | .............. G02B 15/173 359/684 |

FOREIGN PATENT DOCUMENTS

| | | |
|---|---|---|
| CN | 102466872 A | 5/2012 |
| JP | S58136012 A | 8/1983 |
| JP | 2006-178244 A | 7/2006 |
| JP | 2012-047814 A | 3/2012 |
| JP | 2012-083601 A | 4/2012 |

OTHER PUBLICATIONS

Notification of the First Office Action issued by the State Intellectual Property Office of the People's Republic of China dated Mar. 4, 2019 in corresponding Chinese Patent Application No. 201610982275.9, with English translation.

* cited by examiner

*Primary Examiner* — Joseph P Martinez
(74) *Attorney, Agent, or Firm* — Carter, DeLuca & Farrell LLP

(57) ABSTRACT

A zoom lens includes, in order from an object side to an image side, a first lens unit having a positive refractive power, a second lens unit having a negative refractive power, a third lens unit having a positive refractive power, a fourth lens unit having a negative refractive power, and a rear unit including at least one lens unit. In the zoom lens, the locus of movement, the focal length, the amount of displacement during zooming, and the shapes of lens surfaces are appropriately set for each lens unit.

14 Claims, 13 Drawing Sheets

ZOOM LENS AND IMAGE PICKUP APPARATUS INCLUDING THE SAME

BACKGROUND OF THE INVENTION

Field of the Invention

The present invention relates to a zoom lens and an image pickup apparatus including the same, the zoom lens being particularly advantageous as an image pickup optical system for use in an image pickup apparatus such as a digital still camera, a video camera, a monitoring camera, or a broadcasting camera.

Description of the Related Art

As an image pickup optical system for use in an image pickup apparatus, desired is a compact zoom lens having a wide angle of view and a high zoom ratio. The zoom lens is also desired to have a high resolving power. As a zoom lens for achieving a high zoom ratio, a positive-lead type zoom lens is known, which includes, in order from an object side to an image side, first to fourth lens units having positive, negative, positive, and negative refractive powers, respectively, as well as a following rear unit including at least one lens unit.

Japanese Patent Application Publication No. 2012-083601 discloses a zoom lens including first to fifth lens units having positive, negative, positive, negative, and positive refractive powers, respectively. In this zoom lens, the first lens unit is formed of a cemented lens of a negative lens and a positive lens, and the second to fourth lens units move for zooming.

Japanese Patent Application Publication No. 2006-178244 discloses a zoom lens including first to fifth lens units having positive, negative, positive, negative, and positive refractive powers, respectively. In this zoom lens, the first lens unit is formed of a single positive lens, and the second to fifth lens units move for zooming.

Japanese Patent Application Publication No. 2012-47814 discloses a zoom lens including, in order from the object side to the image side, first to sixth lens units having positive, negative, positive, negative, negative, and positive refractive powers, respectively. In this zoom lens, the second, fourth, and fifth lens units move for zooming.

Widening the angle of view of a positive-lead type zoom lens tends to increase the effective diameter of the front lens and thereby enlarge the entire system. Thus, in order to widen the angle of view without sacrificing the compactness of the entire system, it is important to appropriately set the configuration of each lens unit or particularly the first lens unit.

It is also important to appropriately set the refractive powers of the movable lens units, such as the third or fourth lens unit, and the amounts by which these lens units move for zooming.

SUMMARY OF THE INVENTION

A zoom lens of the present invention includes, in order from an object side to an image side, a first lens unit having a positive refractive power, a second lens unit having a negative refractive power, a third lens unit having a positive refractive power, a fourth lens unit having a negative refractive power, and a rear unit including at least one lens unit. The first lens unit does not move for zooming, and each of the third lens unit and the fourth lens unit moves toward the object side during zooming from a wide angle end to a telephoto end, thereby varying an interval between each adjacent two of the lens units during the zooming. The zoom lens satisfies the following conditional expressions:

$$0.1 < f3/|m3| < 0.9,$$

$$-1.4 < f4/|m4| < -0.1, \text{ and}$$

$$1.5 < (R2a+R1a)/(R2a-R1a) < 30.0,$$

where f3 is a focal length of the third lens unit, f4 is a focal length of the fourth lens unit, m3 is an amount of displacement of the third lens unit in the zooming from the wide angle end to the telephoto end, m4 is an amount of displacement of the fourth lens unit in the zooming from the wide angle end to the telephoto end, R1a is a radius of curvature of a lens surface nearest to the object side in the first lens unit, and R2a is a radius of curvature of a lens surface nearest to the image side in the first lens unit.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

A zoom lens of the present invention includes, in order from an object side to an image side, a first lens unit having a positive refractive power, a second lens unit having a negative refractive power, a third lens unit having a positive refractive power, a fourth lens unit having a negative refractive power, and a rear unit including at least one lens unit. The first lens unit does not move for zooming. Each of the third lens unit and the fourth lens unit moves toward the object side during zooming from a wide angle end (a short focal length end) to a telephoto end (a long focal length end), varying the interval of each adjacent lens units during the zooming.

Figure 1:
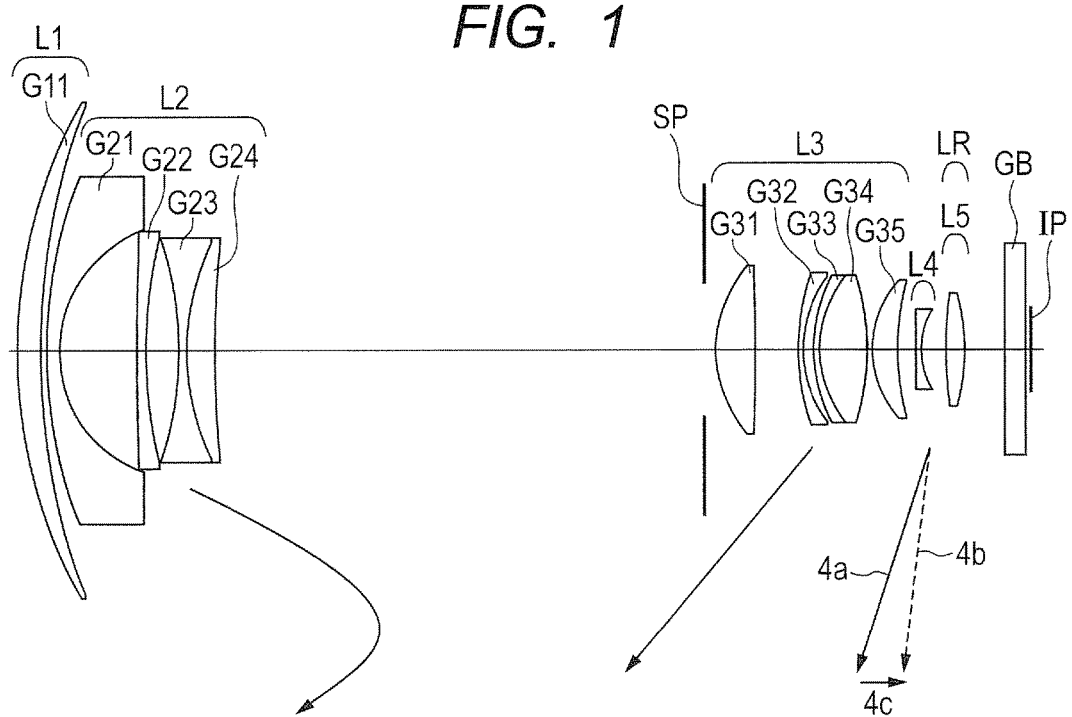
FIG. 1 is a lens sectional view of a zoom lens according to Embodiment 1 at a wide angle end.
Figure 2A:
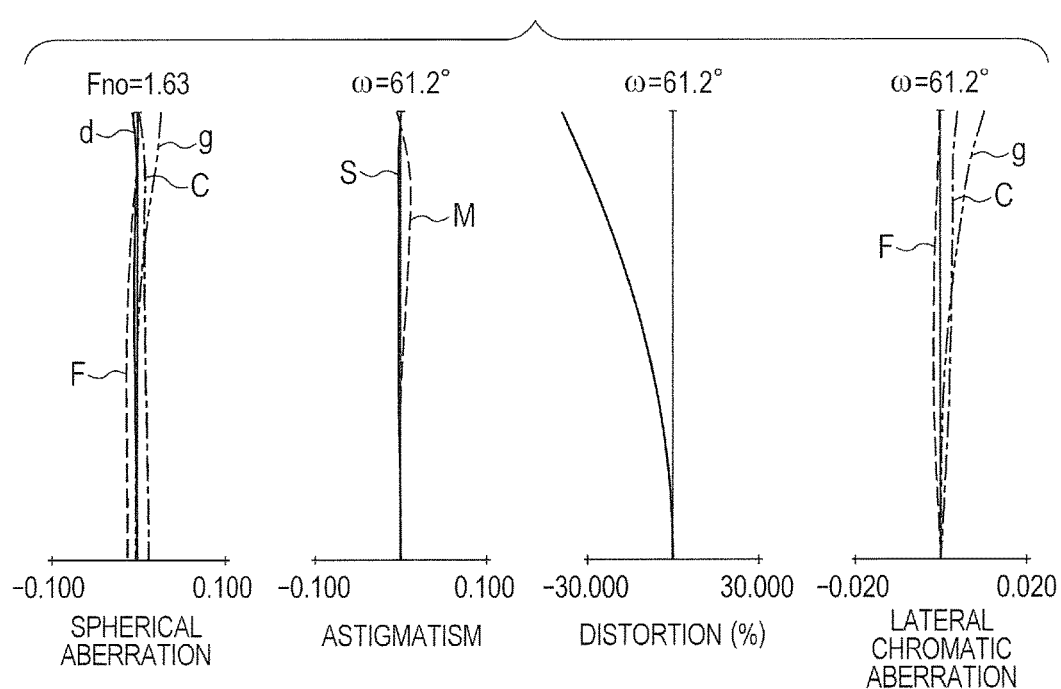
FIG. 2A is a diagram showing aberrations in the zoom lens according to Embodiment 1 at the wide angle end.
Figure 2B:
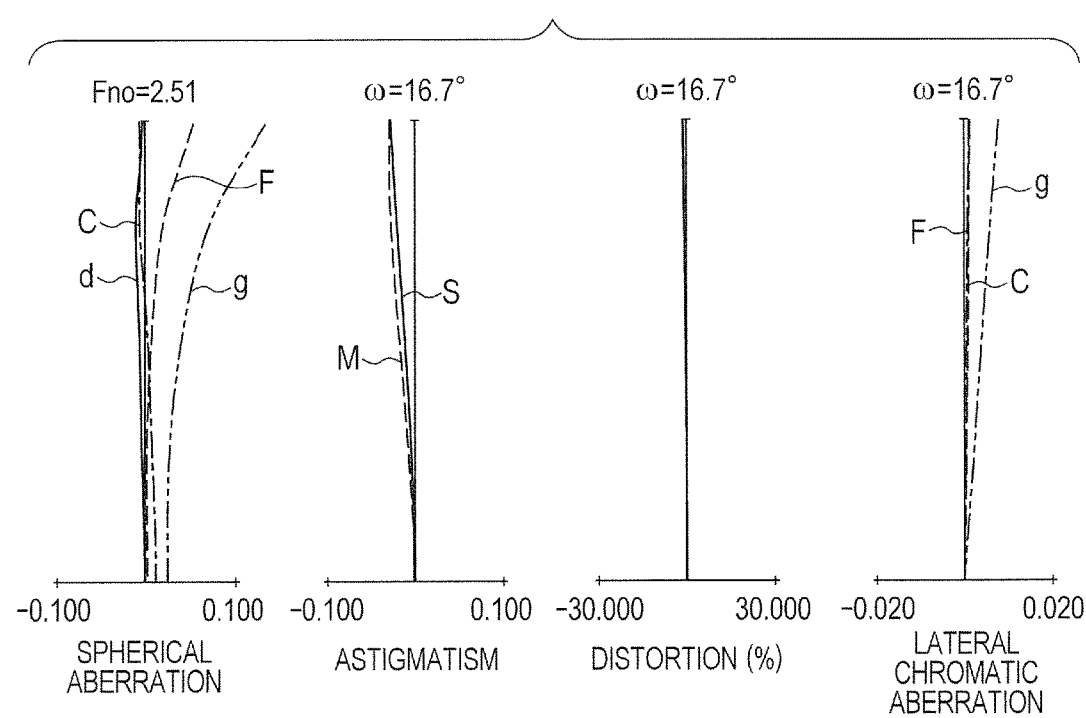
FIG. 2B is a diagram showing aberrations in the zoom lens according to Embodiment 1 at a middle zoom position.
Figure 2C:
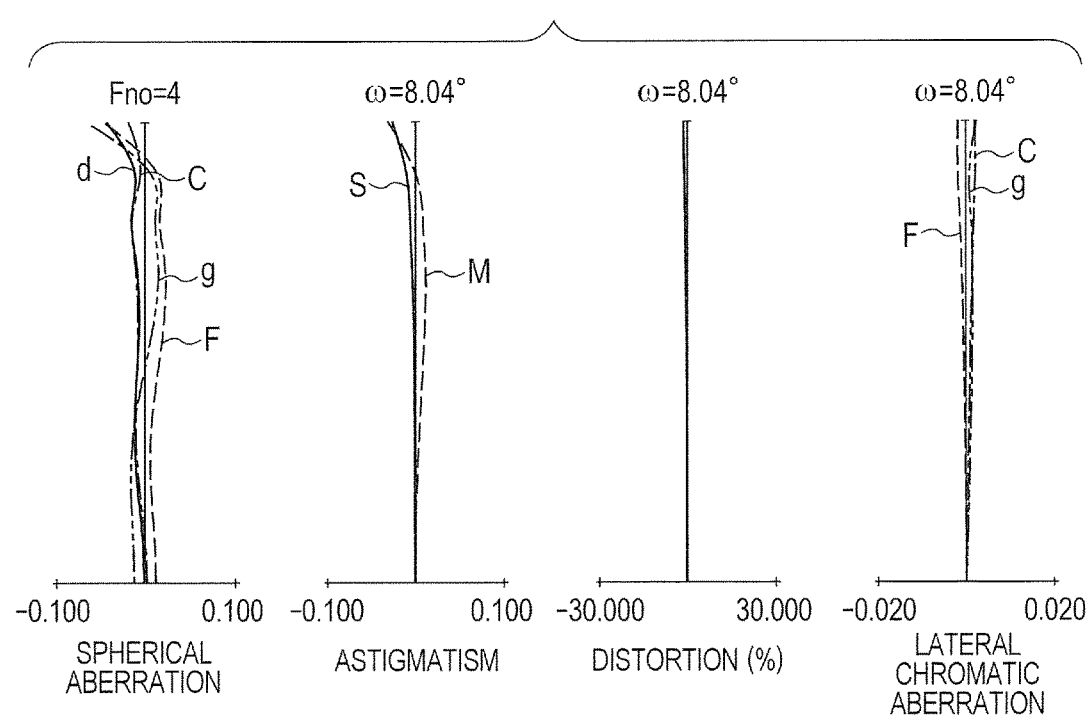
FIG. 2C is a diagram showing aberrations in the zoom lens according to Embodiment 1 at a telephoto end.

FIG. 1 is a lens sectional view of a zoom lens according to Embodiment 1 of the present invention at the wide angle end. FIGS. 2A, 2B, and 2C are diagrams showing aberrations in the zoom lens according to Embodiment 1 at the wide angle end, a middle zoom position, and the telephoto end, respectively. The zoom lens of Embodiment 1 has a zoom ratio of 7.97× and an f-number of 1.63 to 4.00.

Figure 3:
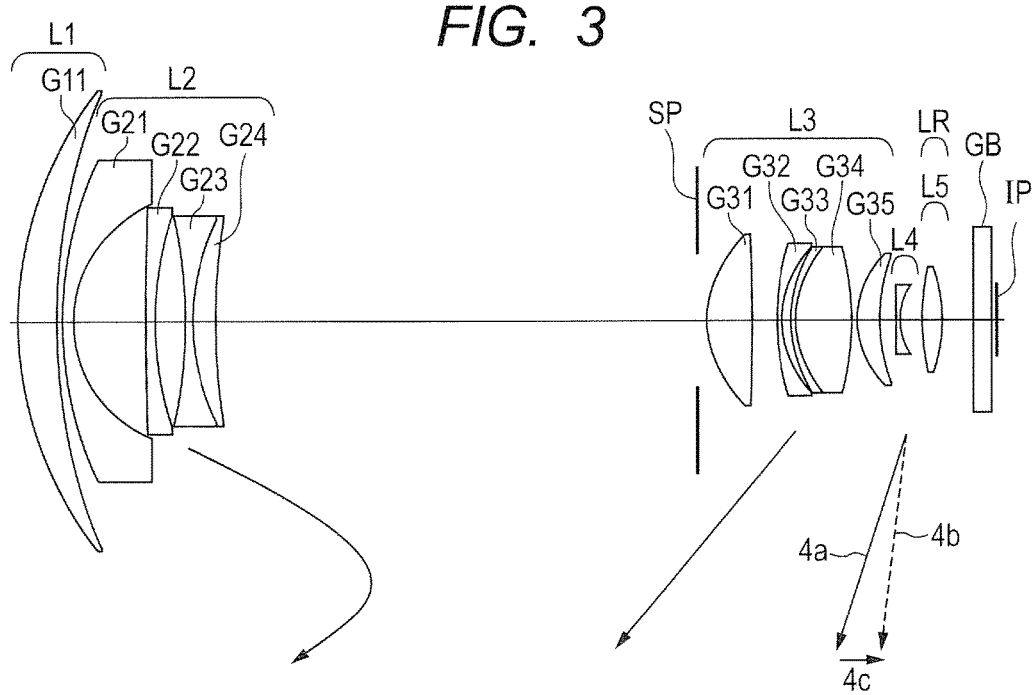
FIG. 3 is a lens sectional view of a zoom lens according to Embodiment 2 at the wide angle end.
Figure 4A:
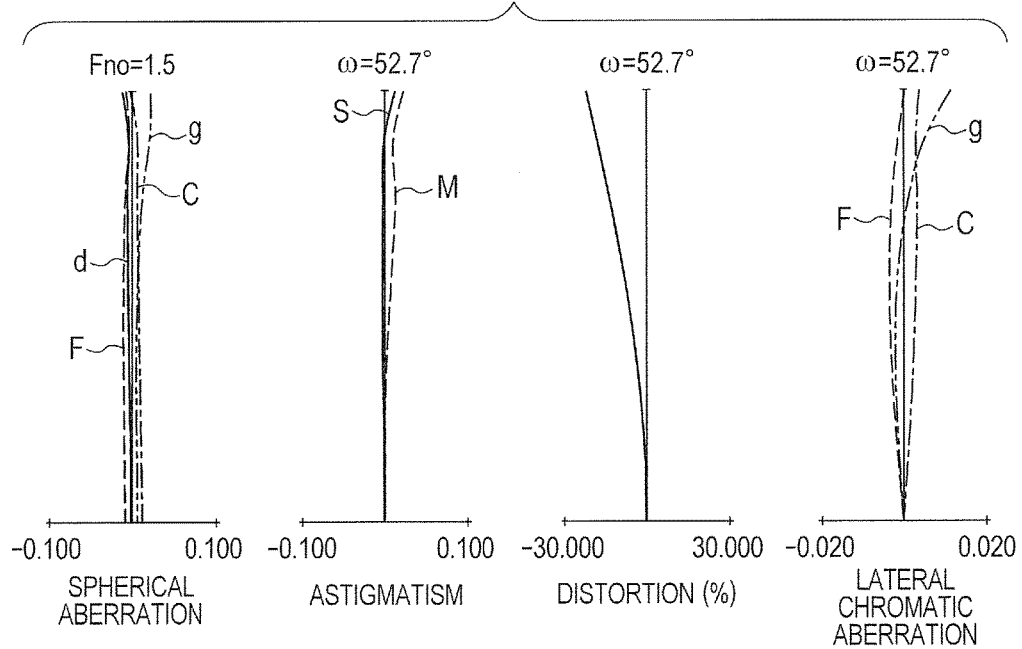
FIG. 4A is a diagram showing aberrations in the zoom lens according to Embodiment 2 at the wide angle end.
Figure 4B:
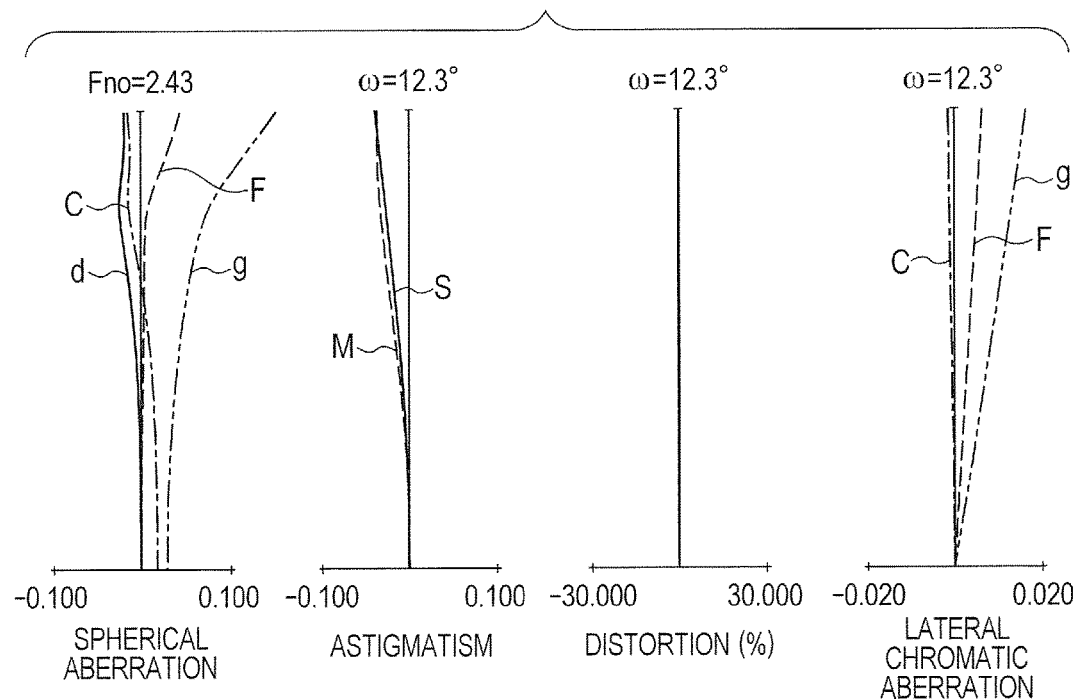
FIG. 4B is a diagram showing aberrations in the zoom lens according to Embodiment 2 at the middle zoom position.
Figure 4C:
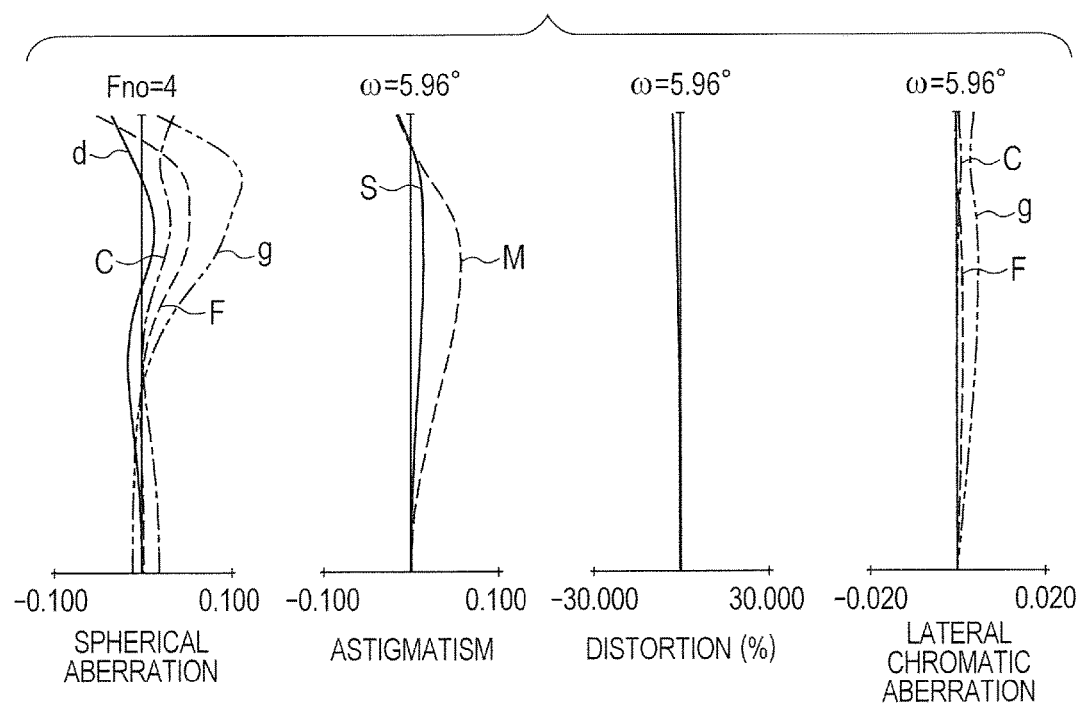
FIG. 4C is a diagram showing aberrations in the zoom lens according to Embodiment 2 at the telephoto end.
Figure 5:
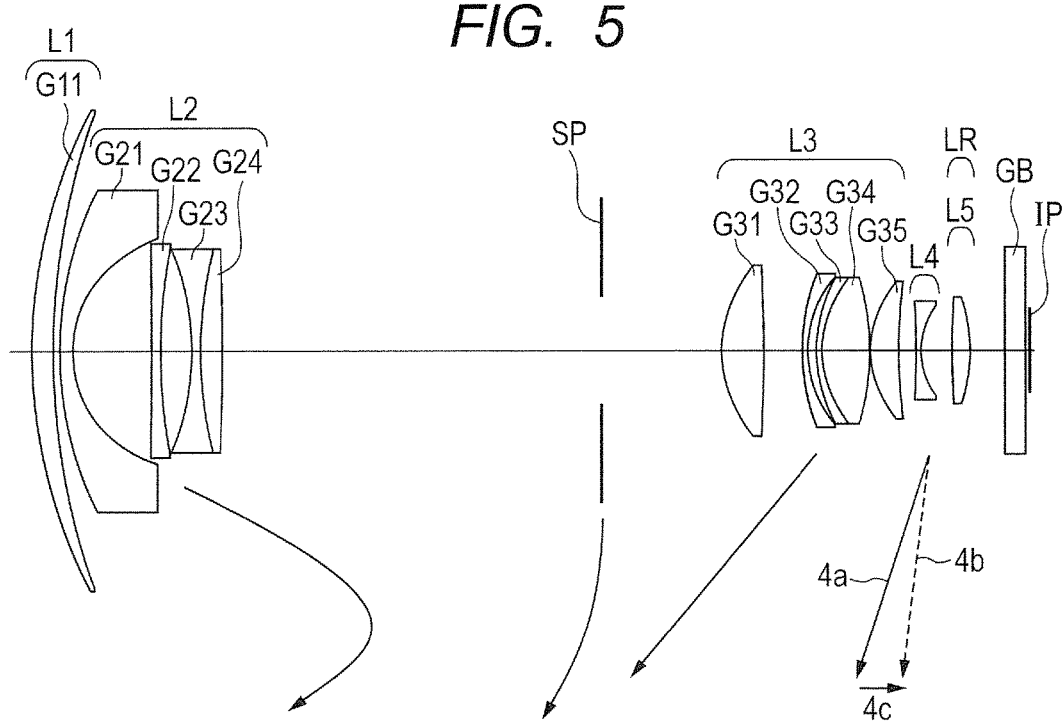
FIG. 5 is a lens sectional view of a zoom lens according to Embodiment 3 at the wide angle end.
Figure 6A:
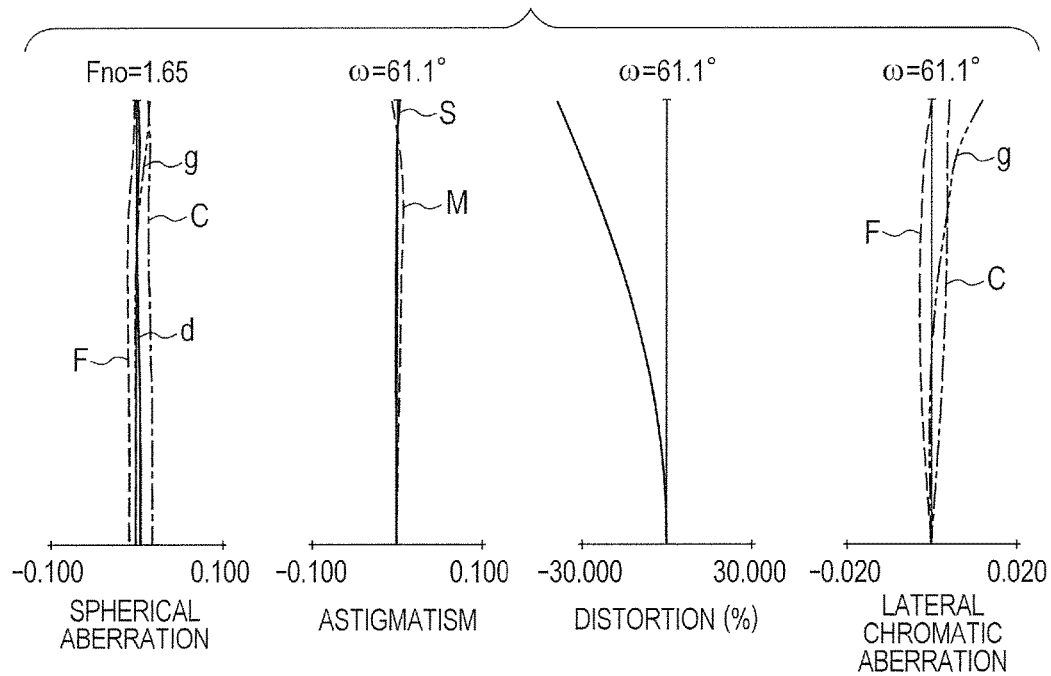
FIG. 6A is a diagram showing aberrations in the zoom lens according to Embodiment 3 at the wide angle end.
Figure 6B:
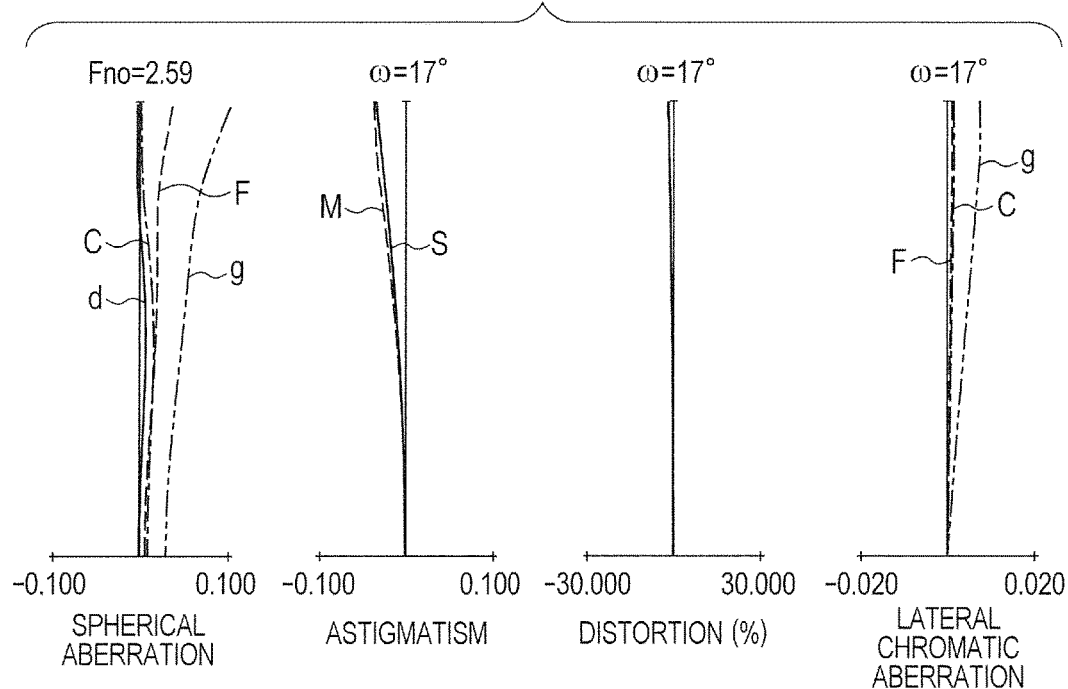
FIG. 6B is a diagram showing aberrations in the zoom lens according to Embodiment 3 at the middle zoom position.
Figure 6C:
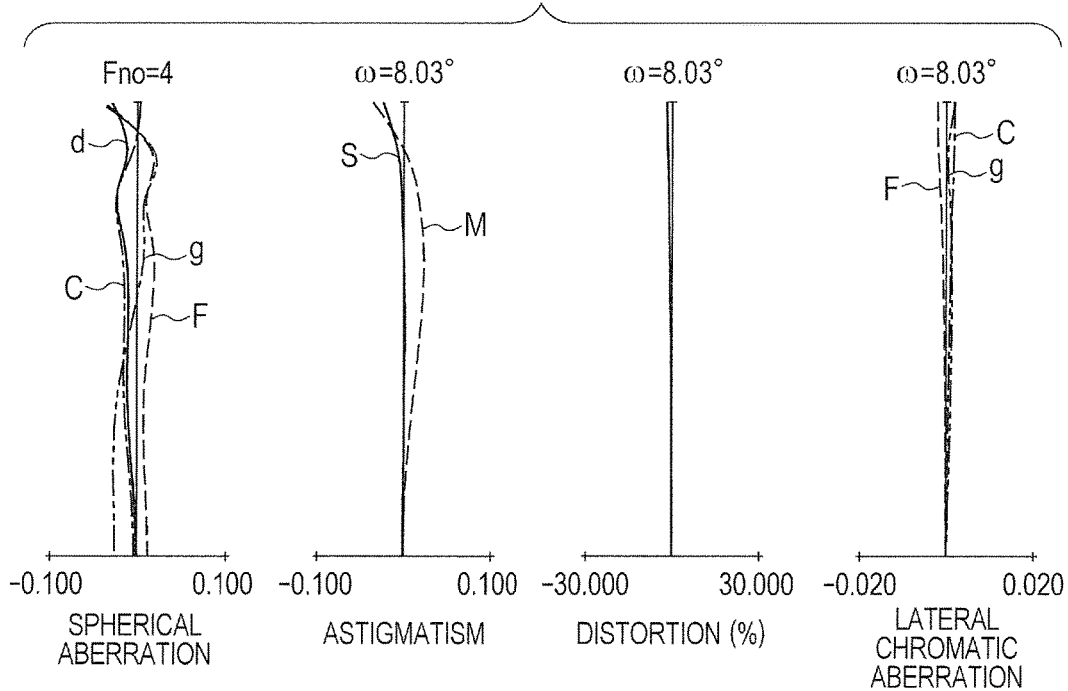
FIG. 6C is a diagram showing aberrations in the zoom lens according to Embodiment 3 at the telephoto end.

FIG. 3 is a lens sectional view of a zoom lens according to Embodiment 2 of the present invention at the wide angle end. FIGS. 4A, 4B, and 4C are diagrams showing aberrations in the zoom lens according to Embodiment 2 at the wide angle end, the middle zoom position, and the telephoto end, respectively. The zoom lens of Embodiment 2 has a zoom ratio of 9.98× and an f-number of 1.50 to 4.00. FIG. 5 is a lens sectional view of a zoom lens according to Embodiment 3 of the present invention at the wide angle end. FIGS. 6A, 6B, and 6C are diagrams showing aberrations in the zoom lens according to Embodiment 3 at the wide angle end, the middle zoom position, and the telephoto end, respectively. The zoom lens of Embodiment 3 has a zoom ratio of 7.97× and an f-number of 1.65 to 4.00.

Figure 7:
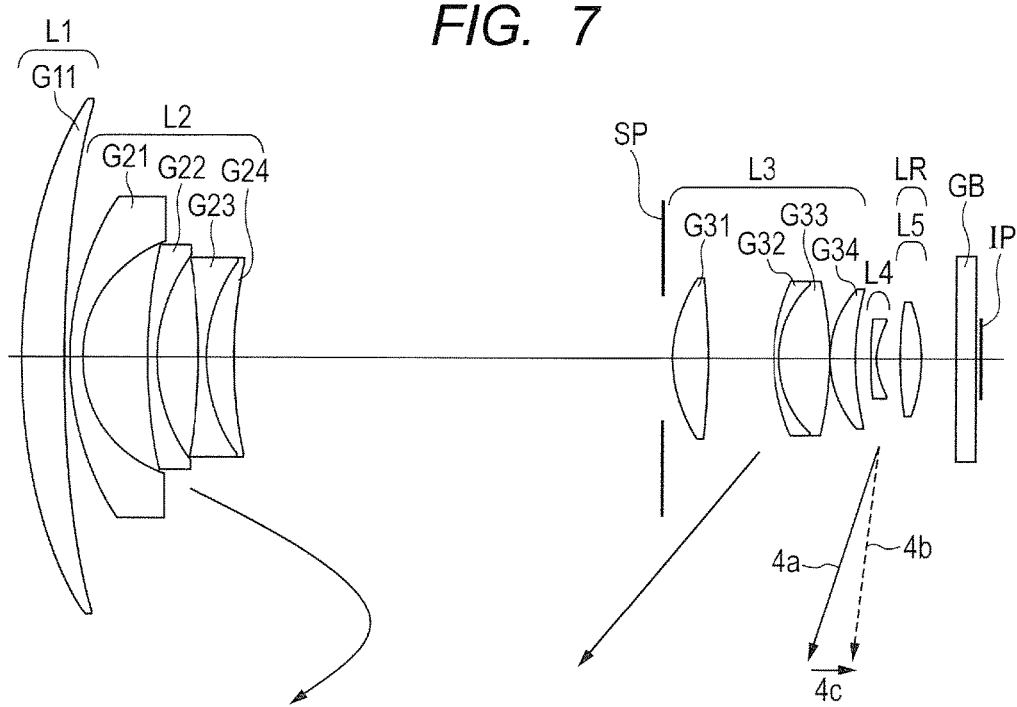
FIG. 7 is a lens sectional view of a zoom lens according to Embodiment 4 at the wide angle end.
Figure 8A:
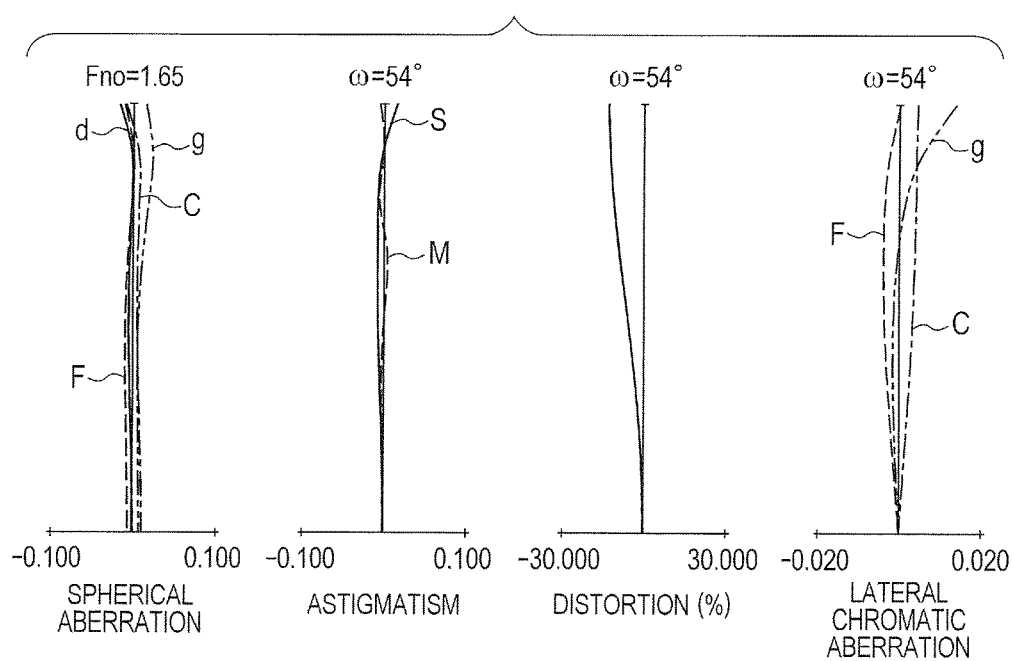
FIG. 8A is a diagram showing aberrations in the zoom lens according to Embodiment 4 at the wide angle end.
Figure 8B:
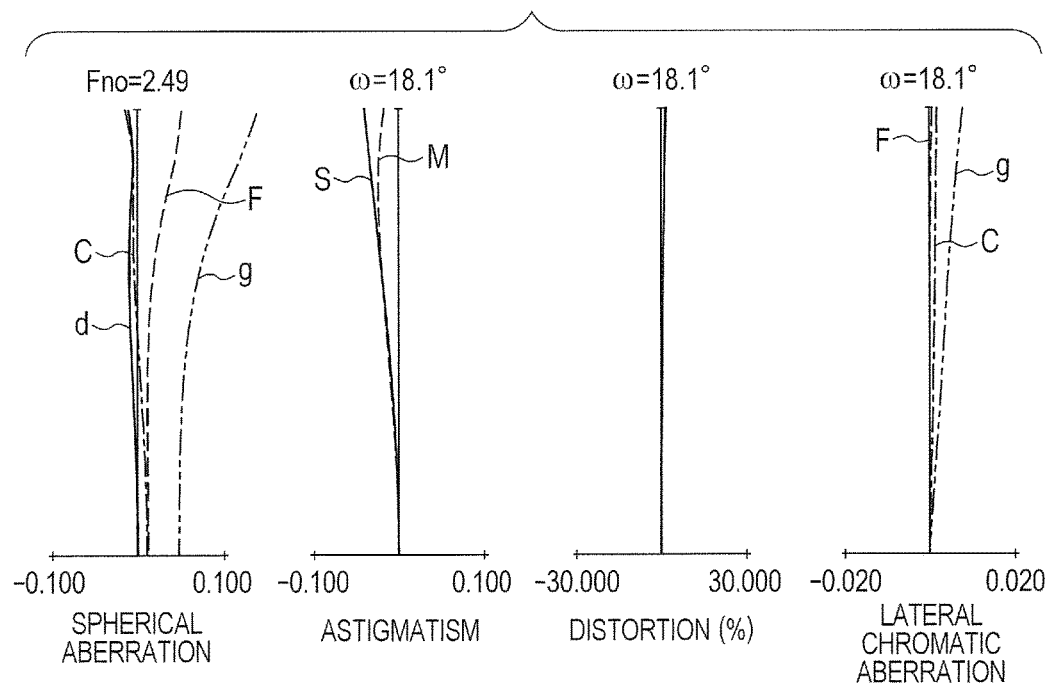
FIG. 8B is a diagram showing aberrations in the zoom lens according to Embodiment 4 at the middle zoom position.
Figure 8C:
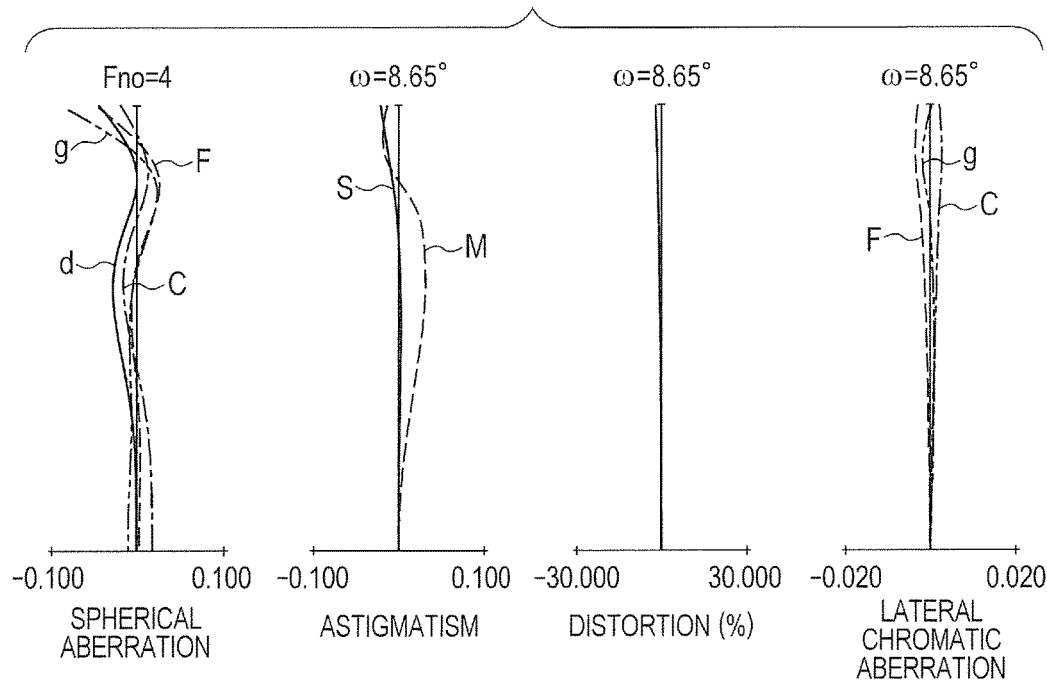
FIG. 8C is a diagram showing aberrations in the zoom lens according to Embodiment 4 at the telephoto end.
Figure 9:
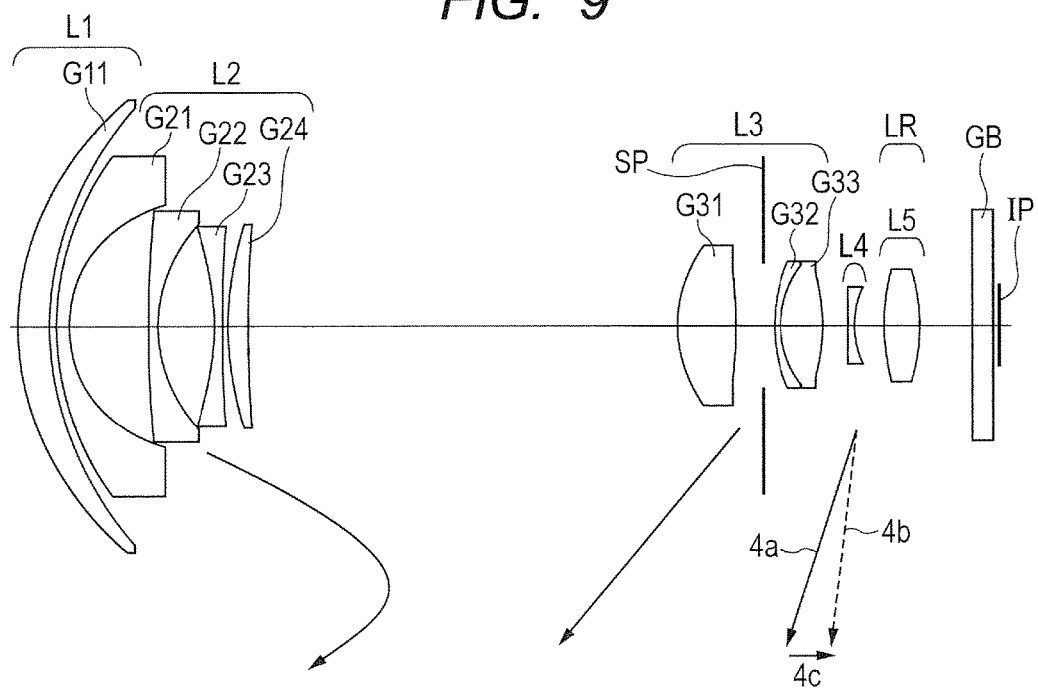
FIG. 9 is a lens sectional view of a zoom lens according to Embodiment 5 at the wide angle end.
Figure 10A:
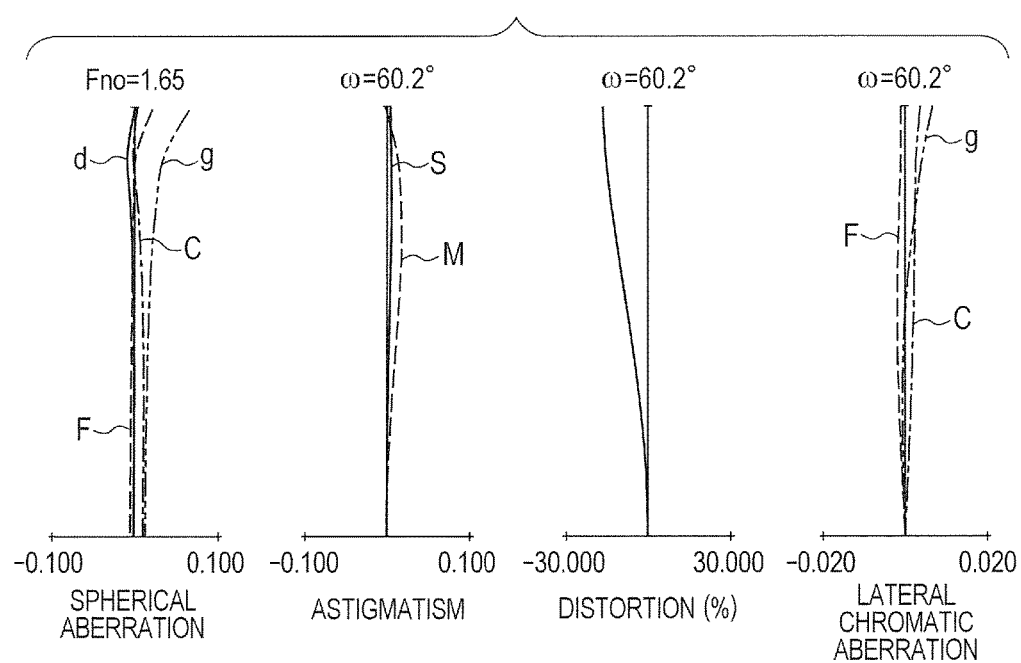
FIG. 10A is a diagram showing aberrations in the zoom lens according to Embodiment 5 at the wide angle end.
Figure 10B:
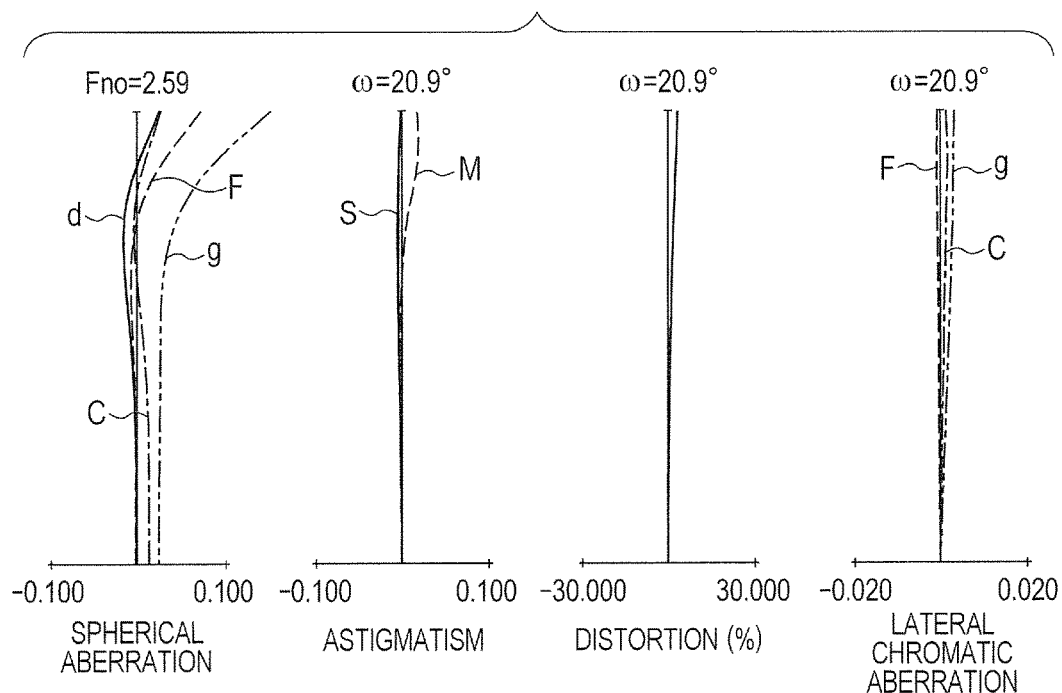
FIG. 10B is a diagram showing aberrations in the zoom lens according to Embodiment 5 at the middle zoom position.
Figure 10C:
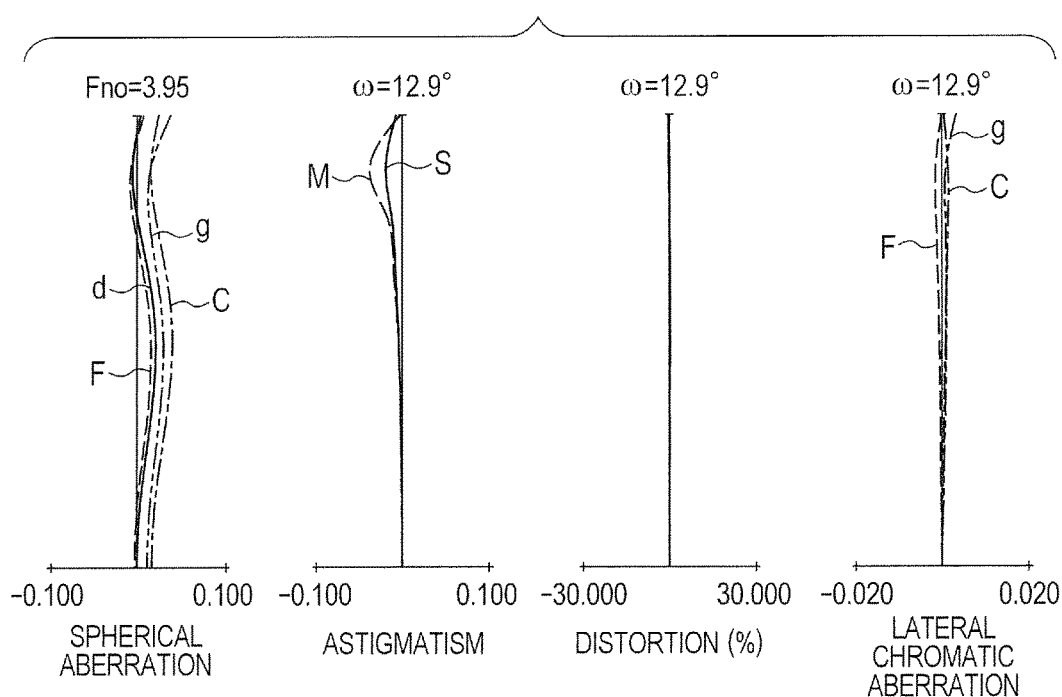
FIG. 10C is a diagram showing aberrations in the zoom lens according to Embodiment 5 at the telephoto end.

FIG. 7 is a lens sectional view of a zoom lens according to Embodiment 4 of the present invention at the wide angle end. FIGS. 8A, 8B, and 8C are diagrams showing aberrations in the zoom lens according to Embodiment 4 at the wide angle end, the middle zoom position, and the telephoto end, respectively. The zoom lens of Embodiment 4 has a zoom ratio of 8.04× and an f-number of 1.65 to 4.00. FIG. 9 is a lens sectional view of a zoom lens according to Embodiment 5 of the present invention at the wide angle end. FIGS. 10A, 10B, and 10C are diagrams showing aberrations in the zoom lens according to Embodiment 5 at the wide angle end, the middle zoom position, and the telephoto end, respectively. The zoom lens of Embodiment 5 has a zoom ratio of 4.99× and an f-number of 1.65 to 3.68.

Figure 11:
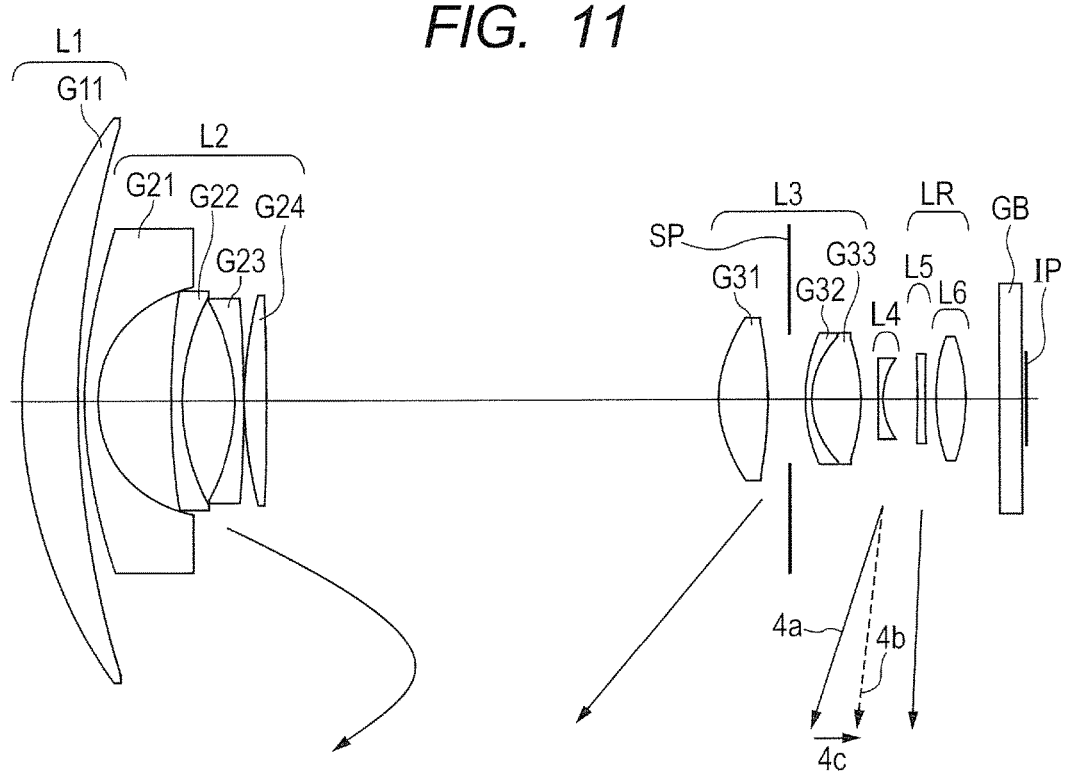
FIG. 11 is a lens sectional view of a zoom lens according to Embodiment 6 at the wide angle end.
Figure 12A:
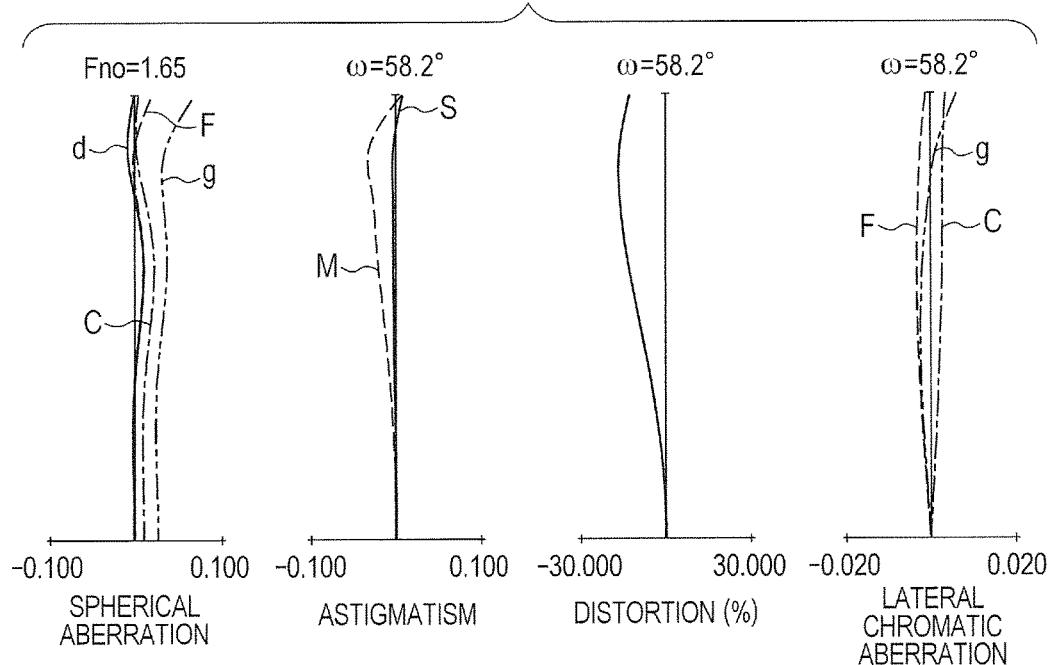
FIG. 12A is a diagram showing aberrations in the zoom lens according to Embodiment 6 at the wide angle end.
Figure 12B:
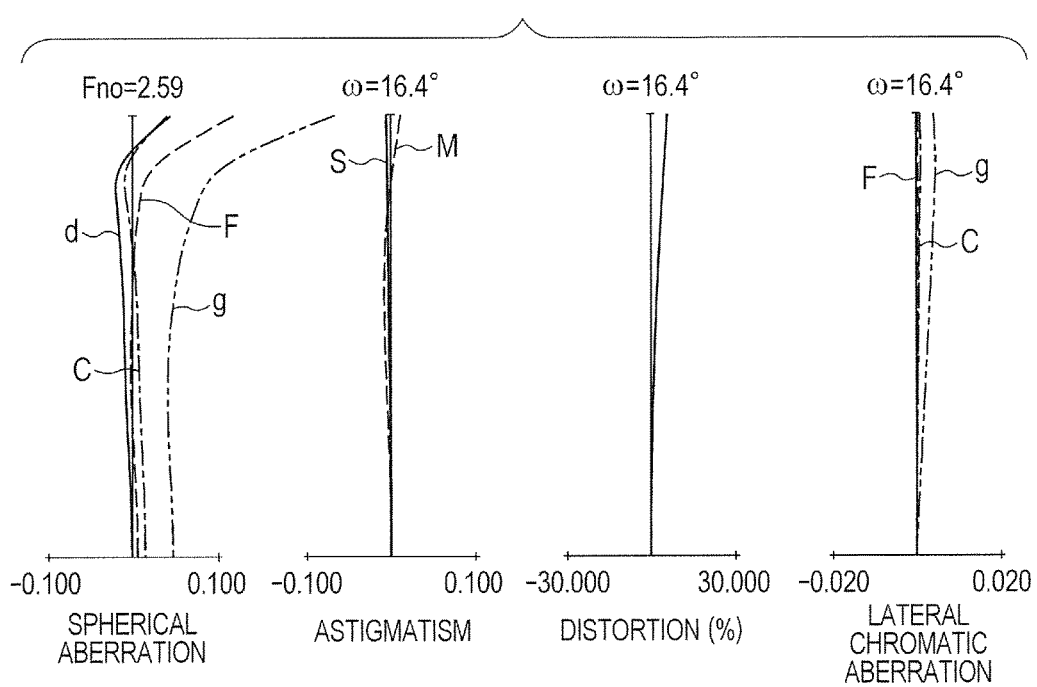
FIG. 12B is a diagram showing aberrations in the zoom lens according to Embodiment 6 at the middle zoom position.
Figure 12C:
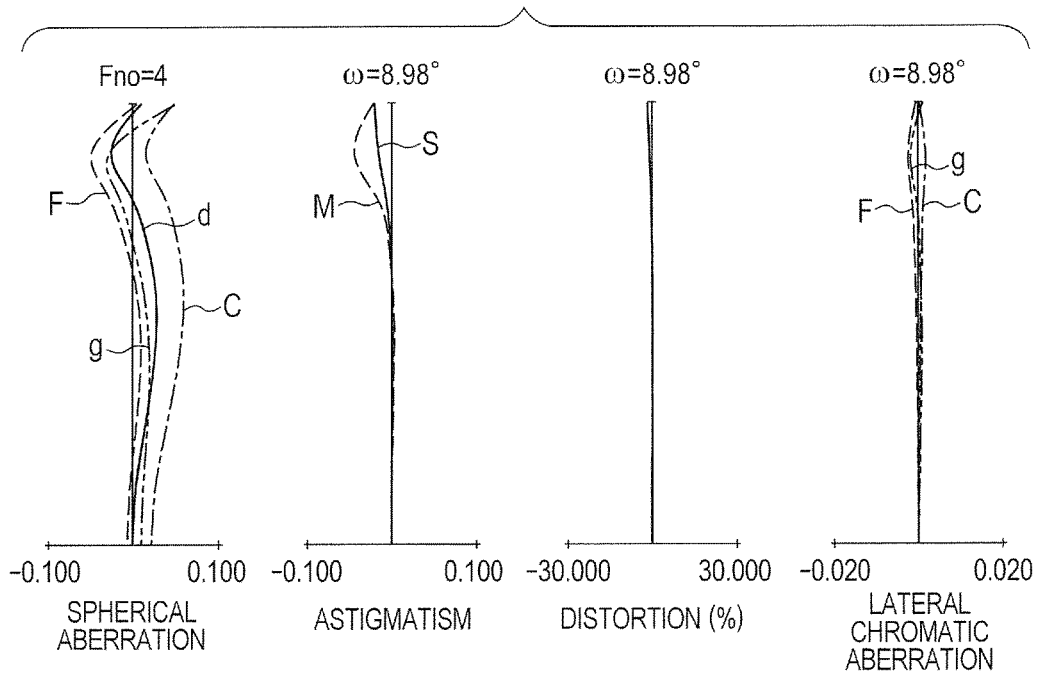
FIG. 12C is a diagram showing aberrations in the zoom lens according to Embodiment 6 at the telephoto end.
Figure 13:
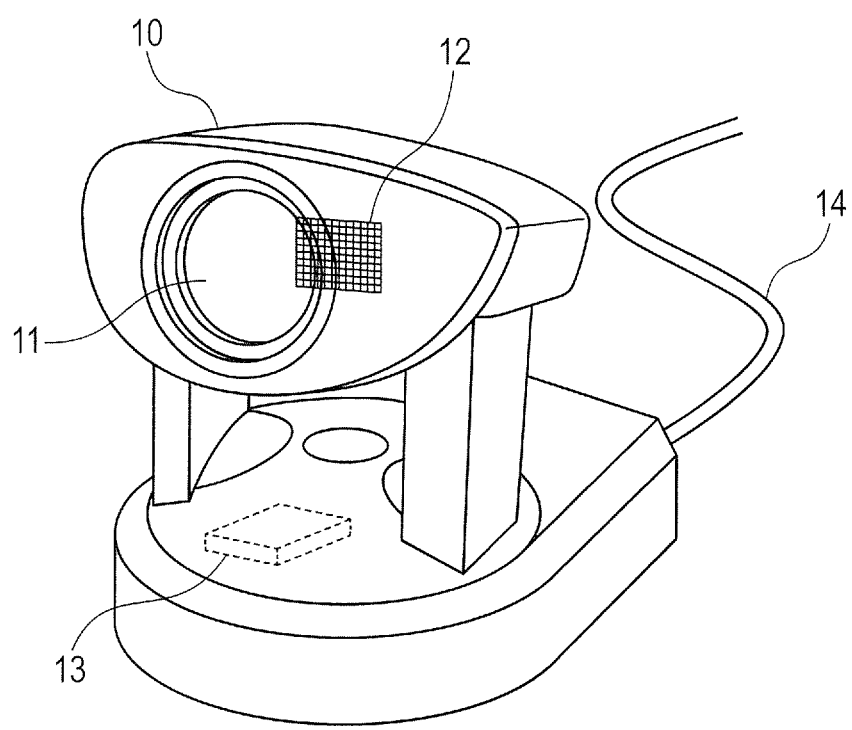
FIG. 13 is a schematic view of a main part of an image pickup apparatus of the present invention.

FIG. 11 is a lens sectional view of a zoom lens according to Embodiment 6 of the present invention at the wide angle end. FIGS. 12A, 12B, and 12C are diagrams showing aberrations in the zoom lens according to Embodiment 6 at the wide angle end, the middle zoom position, and the telephoto end, respectively. The zoom lens of Embodiment 6 has a zoom ratio of 6.93× and an f-number of 1.65 to 4.00. FIG. 13 is a schematic view of a main part of an image pickup apparatus of the present invention.

The zoom lens of each embodiment is an image pickup lens system for use in an image pickup apparatus such as a video camera, a digital camera, a television camera, a monitoring camera, or a silver-halide film camera. In the lens sectional views, the left side is a subject (object) side (i.e., the front side), and the right side is an image side (i.e., the back side). In the lens sectional views, each lens unit is denoted by Li where "i" is the ordinal number of the lens unit from the object side. LR denotes the rear unit including at least one lens unit.

In the lens sectional views, "SP" denotes an aperture stop which is placed either on the object side of the third lens unit L3 or between lenses of the third lens unit. In the lens sectional views, "GB" denotes an optical element such as an optical filter, a face plate, a quartz low-pass filter, or an infrared cut filter. "IP" denotes an image plane. When the zoom lens is used as an image pickup optical system for a video camera or a digital still camera, a solid-state image pickup element (photoelectric conversion element), such as a CCD sensor or a CMOS sensor, is placed at the image plane IP. When the zoom lens is used as an image pickup optical system for a silver-halide film camera, a photosensitive surface, which is equivalent to a film plane, is placed at the image plane IP.

Each arrow shows the locus of a corresponding lens unit moving for zooming from the wide angle end to the telephoto end, as well as the direction of a corresponding lens unit moving for focusing during the zooming. In a part showing spherical aberration in the aberration diagrams, a solid line "d" denotes d-line (wavelength 587.6 nm), a two-dot chain line "g" denotes g-line (wavelength 435.8 nm), a one-dot chain line "C" denotes C-line (wavelength 656.3 nm), and a broken line "F" denotes F-line (486.1 nm). In a part showing astigmatism, a broken line "M" denotes a meridional image plane for d-line, and a solid line "S" denotes a sagittal image plane for d-line. Lateral chromatic aberration is represented by g-line, C-line, and F-line for d-line. "Fno" denotes an f-number, and "ω" denotes a half angle of view) (a half of an angle imaged) (degrees).

In the lens sectional views for Embodiments 1 to 5, "L1" denotes the first lens unit having a positive refractive power, "L2" denotes the second lens unit having a negative refractive power, "L3" denotes the third lens unit having a positive refractive power, and "L4" denotes the fourth lens unit having a negative refractive power. The rear unit LR consists of a fifth lens unit L5 having a positive refractive power. Embodiments 1 to 5 are five-unit zoom lenses.

In Embodiments 1 to 5, the first lens unit L1 and the fifth lens unit L5 do not move for zooming. The rest of the lens units move as shown with the arrows during zooming from the wide angle end to the telephoto end. Specifically, the second lens unit L2 moves toward the image side and then toward the object side, the third lens unit L3 moves toward the object side, and the fourth lens unit L4 moves toward the object side. The aperture stop SP moves toward the object side along the same locus as the third lens unit L3.

The fourth lens unit L4 moves to correct image plane variation caused by zooming and also to perform focusing. Solid curve 4a and dotted curve 4b are the loci of the fourth lens unit L4 moving for the correction of image plane variation caused by zooming, the fourth lens unit L4 moving along the solid curve 4a when focus is at infinity and along the dotted curve 4b when focus is at close-up. To focus from infinity to close-up, the fourth lens unit L4 moves rearward as shown with arrow 4c. The focusing may be performed by a lens unit or lens units other than the fourth lens unit L4. For example, the focusing may be performed by part or all of the second lens unit L2 or by the fifth lens unit L5.

In the lens sectional view for Embodiment 6, "L1" denotes the first lens unit having a positive refractive power, "L2" denotes the second lens unit having a negative refractive power, "L3" denotes the third lens unit having a positive refractive power, and "L4" denotes the fourth lens unit having a negative refractive power. The rear unit LR consists of a fifth lens unit L5 having a negative refractive power and a sixth lens unit L6 having a positive refractive power. Embodiment 6 is a six-unit zoom lens.

In Embodiment 6, the first lens unit L1 and the sixth lens unit L6 do not move for zooming. The rest of the lens units move as shown with the arrows during zooming from the wide angle end to the telephoto end. Specifically, the second lens unit L2 moves toward the image side and then toward the object side, the third lens unit L3 moves toward the object side, the fourth lens unit L4 moves toward the object side, and the fifth lens unit moves toward the object side.

In Embodiment 6, the fourth lens unit L4 moves to perform focusing and correction of image plane variation caused by zooming, like in Embodiments 1 to 5. Solid curve 4a and dotted curve 4b are the loci of the fourth lens unit L4 moving for correction of image plane variation caused by zooming, the fourth lens unit L4 moving along the solid curve 4a when focus is at infinity and along the dotted curve 4b when focus is at close-up. To focus from infinity to close-up, the fourth lens unit L4 moves backward as shown with arrow 4c. The focusing may be performed by a lens unit or lens units other than the fourth lens unit L4. For example, the focusing may be performed by part or all of the second lens unit L2, the fifth lens unit L5, or the sixth lens unit L6.

In each embodiment, the aperture diameter of the aperture stop SP may be variable or invariable. Varying the aperture diameter of the aperture stop SP allows blocking of lower ray coma flare caused by off-axial rays occurring at the telephoto end, enabling better optical performance.

The zoom lens of the present invention satisfies the following conditional expressions.

$$0.1 < f3/|m3| < 0.9 \qquad (1)$$

$$-1.4 < f4/|m4| < -0.1 \qquad (2)$$

$$1.5 < (R2a+R1a)/(R2a-R1a) < 30.0 \qquad (3)$$

In the above conditional expressions, "f3" represents the focal length of the third lens unit L3, "f4" represents the focal length of the fourth lens unit L4, "m3" and "m4" respectively represent the amounts of displacement of the third lens unit L3 and the fourth lens unit L4 during zooming from the wide angle end to the telephoto end, "R1a" represents the radius of curvature of a lens surface nearest to the object side in the first lens unit L1, and "R2a" represents the radius of curvature of a lens surface nearest to the image side in the first lens unit L1.

The amount of displacement mentioned above is the difference in the position of a lens unit between the position closest to an object and the position closest to an image during zooming from the wide angle end to the telephoto end. The sign of the amount of displacement is positive when the lens unit is located closer to the image side at the telephoto end than at the wide angle end, and is negative when the lens unit is located closer to the object side at the telephoto end than at the wide angle end.

Next, the technical meanings of the above conditional expressions are described. There is known a zoom lens including, in order from the object side to the image side, first to fourth lens units having positive, negative, positive, and negative refractive powers, respectively, in which the second lens unit moves toward the image side for zooming from the wide angle end to the telephoto end. To achieve high zooming effect of the second lens unit L2 and size reduction of the entire system at the same time in such a zoom lens, the refractive powers of the first lens unit L1 and the second lens unit L2 need to be increased.

Meanwhile, to achieve favorable optical performance, aberrations need to be reduced by increasing the number of lenses in the first lens unit L1 and the second lens unit L2 so that the refractive power may be divided among these lenses. This, however, increases the thicknesses of the first lens unit L1 and the second lens unit L2. Moreover, to achieve a wide angle of view, the effective diameter of the first lens unit, which is already large, is increased, and this increases the thickness of the first lens unit, as well. These factors hinder size reduction of the entire system.

By contrast, the zoom lens of the present invention is configured such that the third lens unit L3 and the fourth lens unit L4 move for zooming with the second lens unit L2 moving to correct image plane variation caused by the zooming. To achieve high zooming effect in such a configuration, the refractive powers of the second lens unit L2, the third lens unit L3, and the fourth lens unit L4 need to be increased (in absolute value), but the refractive power of the first lens unit L1 does not need to be increased, allowing the first lens unit L1 not to be increased in its effective diameter.

Thus, the first lens unit L1 of the present invention can be formed of fewer lenses, and widening of the angle of view does not increase the effective diameter of the front lens so much. Size reduction of the entire system is thus facilitated.

In addition, the zoom lens of the present invention is configured such that the third lens unit L3 and the fourth lens unit L4 move toward the object side independently of each other (along different loci) during zooming from the wide angle end to the telephoto end, so that the third lens unit L3 and the fourth lens unit L4 may share the responsibility for zooming. This configuration enables a high zoom ratio with shorter zoom strokes (amounts of displacement), as well as size reduction of the overall lens length. By further satisfying Conditional Expressions (1) to (3), the zoom lens of the present invention achieves a wide angle of view, a high zoom ratio, size reduction of the entire system, and favorable optical performance over the entire zoom range.

Conditional Expression (1) defines the ratio of the focal length of the third lens unit L3 to the amount of displacement of the third lens unit L3 for zooming. By satisfying Conditional Expression (1), the zoom lens of the present invention achieves a high zoom ratio and size reduction of the entire system at the same time. If the focal length of the third lens unit L3 is too short, making the ratio of Conditional Expression (1) fall below the lower limit defined therein, spherical aberration and coma increase over the entire zoom range to an extent that it is difficult to reduce these aberrations.

Conversely, if the focal length of the third lens unit L3 is too long, making the ratio of Conditional Expression (1) exceed the upper limit defined therein, the third lens unit L3 produces only a small zooming effect. Then, to achieve a high zoom ratio, the third lens unit L3 and the fourth lens unit L4 have to move longer for zooming (i.e., by larger amounts of displacement). This is not preferable because such longer zoom strokes extend the overall lens length.

Conditional Expression (2) defines the ratio of the focal length of the fourth lens unit L4 to the amount of displacement of the fourth lens unit L4 for zooming. By satisfying Conditional Expression (2), the zoom lens of the present invention achieves a high zoom ratio and size reduction of the entire system at the same time. If the fourth lens unit L4 has a negative focal length too short (or a negative refractive power too large in absolute value), making the ratio of Conditional Expression (2) exceed the upper limit defined therein, spherical aberration and coma increase over the entire zoom range to an extent that it is difficult to reduce these aberrations.

Conversely, if the fourth lens unit L4 has a negative focal length too long (or a negative refractive power too small in absolute value), making the ratio of Conditional Expression (2) fall below the lower limit defined therein, the fourth lens unit L4 produces only a small zooming effect. Then, to achieve a high zoom ratio, the third lens unit L3 and the fourth lens unit L4 have to move longer for zooming. This is not preferable because such longer zoom strokes extend the overall lens length.

Conditional Expression (3) defines the radius of curvature of the lens surface nearest to the object side in the first lens unit L1 and the radius of curvature of the lens surface nearest to the image side in the first lens unit L1. By satisfying Conditional Expression (3), the zoom lens of the present invention achieves a wide angle of view, high optical performance, and size reduction of the entire system at the same time. If the radius of curvature R1a and the radius of curvature R2a are too large, making the ratio of Conditional Expression (3) fall below the lower limit defined therein, the incident height of off-axial rays passing through the lens surface nearest to the object side in the first lens unit L1 is large at the wide angle end. Then, the first lens unit L1 has to be increased in size. Conversely, if the radius of curvature R1a and the radius of curvature R2a are too small, making the ratio of Conditional Expression (3) exceed the upper limit defined therein, field curvature increases at the wide angle end.

In each embodiment, each element is appropriately set to satisfy the Conditional Expressions (1) to (3) described above. Thereby, the zoom lens achieves a high zoom ratio, high optical performance, and size reduction of the entire system at the same time.

Preferably, the numbers in Conditional Expressions (1) to (3) may be set as follows in each embodiment.

$$0.3 < f3/|m3| < 0.8 \quad (1a)$$

$$-1.2 < f4/|m4| < -0.3 \quad (2a)$$

$$2.0 < (R2a+R1a)/(R2a-R1a) < 20.0 \quad (3a)$$

As described above, the present invention provides a zoom lens achieving a wide angle of view, a high zoom ratio, size reduction of the entire system, and favorable optical performance.

More preferably, the zoom lens of the present invention may satisfy at least one of the following conditional expressions.

$$20.0 < f1/D1 < 200.0 \quad (4)$$

$$1.50 < nd11a < 1.80 \quad (5)$$

$$45.0 < vd11a < 75.0 \quad (6)$$

$$-3.6 < f2/fw < -2.0 \quad (7)$$

$$1.85 < nd24a < 2.00 \quad (8)$$

$$14.0 < vd24a < 22.0 \quad (9)$$

$$65.0 < vd3a \quad (10)$$

$$0.010 < \theta gF - (0.644 - 0.00168 \times vd) < 0.070 \quad (11)$$

$$0.5 < m2/ft < 1.3 \quad (12)$$

In the above conditional expressions, "f1" represents the focal length of the first lens unit L1, and "D1" represents the thickness of the first lens unit L1 on the optical axis (lens-unit thickness), "nd11a" represents the refractive index of a material of a positive lens G11 which solely constitutes the first lens unit L1, "vd11a" represents the Abbe number of the material of the positive lens G11, "f2" represents the focal length of the second lens unit L2, and "fw" represents the focal length of the entire system at the wide angle end.

In addition, "nd24a" represents the refractive index of a material of a positive lens G24, which is one of the lenses constituting the second lens unit L2 wherein the second unit L2 is constituted by, in order from the object side to the image side, a negative lens G21, a negative lens G22, a negative lens G23, and the positive lens G24, "vd24a" represents the Abbe number of the material of the positive lens G24, "vd3a" represents an average Abbe number of materials of multiple positive lenses in the third lens unit L3, "vd" represents the Abbe number of the materials of at least two of the positive lenses in the third lens unit L3, and "θgF" represents the partial dispersion ratio of the materials of the two positive lenses.

Moreover, "m2" represents the distance between the positions, on the optical axis, of the second lens unit L2 which moves toward the image side and then toward the object side during zooming from the wide angle end to the telephoto end. Specifically, the distance is from the position of the second lens unit L2 situated closest to an object and the position of the second lens unit L2 situated closest to an image during the zooming from the wide angle end to the telephoto end. Lastly, "ft" represents the focal length of the entire system at the telephoto end.

The Abbe number and the partial dispersion ratio of an optical material in the embodiments are determined as follows. When Ng, NF, Nd, and NC represent the refractive indexes of the material for g-line (435.8 nm), F-line (486.1 nm), d-line (587.6 nm), and C-line (656.3 nm) (Fraunhofer lines), respectively, the Abbe number vd of the material and the partial dispersion ratio θgF of the material for g-line and F-line are expressed by the following formulae, respectively.

$$vd=(Nd-1)/(NF-NC)$$

$$\theta gF=(Ng-NF)/(NF-NC)$$

Next, the technical meanings of the above conditional expressions are described.

Conditional Expression (4) defines the ratio of the focal length of the first lens unit L1 to the thickness of the first lens unit L1 on the optical axis (lens-unit thickness). By satisfying Conditional Expression (4), the zoom lens of the present invention achieves a wide angle of view and size reduction of the lens system at the same time.

If the lens-unit thickness of the first lens unit L1 is too large, making the ratio of Conditional Expression (4) fall below the lower limit defined therein, the incident height of off-axial rays passing through the lens surface nearest to the object side in the first lens unit L1 is large in a zoom range near the wide angle end. Then, the effective diameter of the front lens (i.e., the first lens unit L1) has to be increased. Conversely, if the focal length of the first lens unit L1 is too long, making the ratio of Conditional Expression (4) exceed the upper limit defined therein, the effective diameter of the front lens has to be increased if the angle of view is to be widened.

Conditional Expression (5) defines the refractive index of the material of the positive lens G11 of the first lens unit L1. By satisfying Conditional Expression (5), the zoom lens of the present invention achieves favorable optical performance and size reduction of the entire system at the same time. If the refractive index of the material of the positive lens G11 is too low, falling below the lower limit defined in Conditional Expression (5), the lens-unit thickness of the first lens unit L1 increases, which extends the overall lens length as a result.

Conversely, if the refractive index of the material of the positive lens G11 is too high, exceeding the upper limit defined in Conditional Expression (5), the Petzval sum decreases, which increases field curvature and astigmatism to an extent that it is difficult to correct them.

Conditional Expression (6) defines the Abbe number of the material of the positive lens G11 of the first lens unit L1. By satisfying Conditional Expression (6), the zoom lens of the present invention facilitates correction of lateral chromatic aberration at the wide angle end and therefore achieves favorable optical performance.

An Abbe number falling below the lower limit defined in Conditional Expression (6) is undesirable because lateral chromatic aberration increases at the wide angle end. Conversely, an Abbe number exceeding the upper limit defined in Conditional Expression (6) is also undesirable because lateral chromatic aberration is over-corrected at the wide angle end.

Conditional Expression (7) defines the focal length of the second lens unit L2. By satisfying Conditional Expression (7), the zoom lens of the present invention achieves favorable optical performance and size reduction of the lens system at the same time. If the negative focal length of the second lens unit L2 is too large in absolute value, making the ratio of Conditional Expression (7) fall below the lower limit defined therein, a lens unit configured to correct image plane variation caused by zooming has to move longer, which extends the overall lens length. Conversely, if the negative focal length of the second lens unit L2 is too small in absolute value, making the ratio of Conditional Expression (7) exceed the upper limit defined therein, large field curvature undesirably occurs at the wide angle end.

Conditional Expression (8) defines the refractive index of the material of the positive lens G24 which is a lens in the second lens unit L2 closest to an image. By satisfying Conditional Expression (8), the zoom lens of the present invention achieves favorable optical performance and size reduction of the entire system at the same time. If the refractive index of the material of the positive lens G24 is too low, falling below the lower limit defined in Conditional Expression (8), the lens-unit thickness of the second lens unit L2 has to be increased, and this extends the overall lens length. Conversely, if the refractive index of the material of the positive lens G24 is too high, exceeding the upper limit defined in Conditional Expression (8), the Petzval sum decreases to an extent that it is difficult to correct field curvature and astigmatism.

Conditional Expression (9) defines the Abbe number of the material of the positive lens G24 which is a lens in the second lens unit L2 closest to an image. By satisfying Conditional Expression (9), the zoom lens of the present invention favorably corrects lateral chromatic aberration at the wide angle end and thus achieves high optical performance. If the Abbe number of the material of the positive lens G24 is too small, falling below the lower limit defined in Conditional Expression (9), lateral chromatic aberration is over-corrected at the wide angle end. Conversely, if the Abbe number of the material of the positive lens G24 is too large, exceeding the upper limit defined in Conditional Expression (9), lateral chromatic aberration is under-corrected at the wide angle end.

Conditional Expression (10) defines the average Abbe number of the materials of the positive lenses in the third lens unit L3. By satisfying Conditional Expression (10), the zoom lens of the present invention achieves favorable optical performance and a high zoom ratio at the same time. If the average Abbe number of the materials of the positive lenses is too small, falling below the lower limit defined in Conditional Expression (10), axial chromatic aberration increases over the entire zoom range, which makes it difficult to achieve favorable optical performance.

Conditional Expression (11) defines the Abbe number and partial dispersion ratio of at least two of the positive lenses in the third lens unit L3. By satisfying Conditional Expression (11), the zoom lens of the present invention achieves favorable optical performance and a high zoom ratio at the same time. If the partial dispersion ratio θgF is too small, making the value of Conditional Expression (11) fall below the lower limit defined therein, axial chromatic aberration (secondary spectrum) is under-corrected over the entire zoom range. Conversely, if the partial dispersion ratio θgF is too large, making the value of Conditional Expression (11) exceed the upper limit defined therein, axial chromatic aberration (secondary spectrum) is over-corrected over the entire zoom range.

Conditional Expression (12) defines the distance by which the second lens unit L2 moves for zooming, i.e., the amount of displacement of the second lens unit L2 from the position, on the optical axis, closest to an object to the position, on the optical axis, closest to an image. By satisfying Conditional Expression (12), the zoom lens of the present invention achieves size reduction of the lens system and a high zoom ratio at the same time. If the amount of displacement of the second lens unit L2 is too small, making the ratio of Conditional Expression (12) fall below the lower limit defined therein, the negative refractive power of the second lens unit L2 has to be increased (in absolute value) for a high zoom ratio. Then, field curvature and lateral chromatic aberration vary greatly during zooming. Conversely, if the amount of displacement of the second lens unit L2 is too large, making the ratio of Conditional Expression (12) exceed the upper limit defined therein, the overall lens length increases.

Preferably, the numbers in Conditional Expressions (4) to (12) may be set as follows in the embodiments.

$$25.0 < f1/D1 < 140.0 \tag{4a}$$

$$1.55 < nd11a < 1.75 \tag{5a}$$

$$50.0 < vd11a < 65.0 \tag{6a}$$

$$-3.2 < f2/fw < -2.2 \tag{7a}$$

$$1.90 < nd24a < 2.00 \tag{8a}$$

$$16.0 < vd24a < 20.0 \tag{9a}$$

$$68.0 < \nu d3a \quad (10a)$$

$$0.013 < \theta gF - (0.644 - 0.00168 \times \nu d) < 0.040 \quad (11a)$$

$$0.65 < m2/ft < 1.15 \quad (12a)$$

When the elements of the zoom lens of each embodiment are configured as above, the zoom lens can achieve size reduction of the entire system, a wide angle of view, a high zoom ratio, and high optical performance over the entire zoom range. Advantageous effects of the present invention can be enhanced when the above conditional expressions are combined appropriately.

Next, the configurations of the zoom lenses of Embodiments 1 to 6 are described. Unless otherwise specified, the lenses in the lens units of the embodiments are arranged in order from the object side to the image side.

[Embodiments 1, 2, and 3]

The first lens unit L1 is formed of a positive meniscus lens (G11) having a convex surface facing to the object side. This configuration facilitates reduction in the effective diameter of the front lens. The second lens unit L2 is formed of a negative meniscus lens (G21) having a convex surface facing to the object side, a negative meniscus lens (G22) having a convex surface facing to the object side, and a cemented lens formed by cementing a negative biconcave lens (G23) and a positive meniscus lens (G24) having a convex surface facing to the object side.

Alternatively, the second lens unit L2 is formed of a negative meniscus lens (G21) having a convex surface facing to the object side, a negative biconcave lens (G22), and a cemented lens formed by cementing a negative biconcave lens (G23) and a positive biconvex lens (G24). The negative refractive power of the second lens unit L2 is thus divided among the three negative lenses, which enables reduction of field curvature which would occur when the angle of view is widened.

The third lens unit L3 is formed of a positive biconvex lens (G31) being aspherical on both of its surfaces, a negative meniscus lens (G32) having a convex surface facing to the object side, a cemented lens formed by cementing a negative meniscus lens (G33) having a convex surface facing to the object side and a positive biconvex lens (G34) being aspherical on its image-side surface, and a positive meniscus lens (G35) having a convex surface facing to the object side. This configuration enables a high zoom ratio and reduction in spherical aberration and coma over the entire zoom range.

The fourth lens unit L4 is formed of a negative biconcave lens being aspherical on both of its lens surfaces. Such a configuration of the fourth lens unit L4 having aspherical lens surfaces achieves both a high zoom ratio and reduction in coma at the middle zoom position. The fifth lens unit L5 is formed of a positive biconvex lens. Being a positive lens, the fifth lens unit L5 enhances telecentricity to cause off-axial rays to enter the image pickup element at an angle close to the right angle, thereby reducing peripheral light fall-off caused due to shading.

[Embodiment 4]

The first lens unit L1 is formed of a positive meniscus lens (G11) having a convex surface facing to the object side and being aspherical on both of its surfaces. The first lens unit L1 being aspherical on both of its surfaces facilitates correction of distortion at the wide angle end. The second lens unit L2 is formed of a negative meniscus lens (G21) having a convex surface facing to the object side, a negative meniscus lens (G22) having a convex surface facing to the object side, and a cemented lens formed by cementing a negative biconcave lens (G23) and a positive meniscus lens (G24) having a convex surface facing to the object side.

The third lens unit L3 is formed of a positive biconvex lens (G31) being aspherical on both of its surfaces, a cemented lens formed by cementing a negative meniscus lens (G32) having a convex surface facing to the object side and a positive biconvex lens (G33) being aspherical on its image-side surface, and a positive meniscus lens (G34) having a convex surface facing to the object side. The fourth lens unit L4 is formed of a negative biconcave lens being aspherical on both of its surfaces. The fifth lens unit L5 is formed of a single positive biconvex lens.

[Embodiment 5]

The first lens unit L1 is formed of a positive meniscus lens (G11) having a convex surface facing to the object side. The second lens unit L2 is formed of a negative meniscus lens (G21) having a convex surface facing to the object side, a negative meniscus lens (G22) having a convex surface facing to the object side, a negative biconcave lens (G23), and a positive meniscus lens (G24) having a convex surface facing to the object side.

The third lens unit L3 is formed of a positive biconvex lens (G31) being aspherical on both of its surfaces, a cemented lens formed by cementing a negative meniscus lens (G32) having a convex surface facing to the object side and a positive biconvex lens (G33) being aspherical on its surface on the image side. The fourth lens unit L4 is formed of a negative biconcave lens. The fifth lens unit L5 is formed of a single positive biconvex lens.

[Embodiment 6]

The first lens unit L1 is formed of a positive meniscus lens (G11) having a convex surface facing to the object side. The second lens unit L2 is formed of a negative meniscus lens (21) having a convex surface facing to the object side, a negative meniscus lens (G22) having a convex surface facing to the object side, a negative meniscus lens (G23) having a convex surface facing to the image side, and a positive biconvex lens (G24).

The third lens unit L3 is formed of a positive biconvex lens (G31) being aspherical on both of its surfaces, a cemented lens formed by cementing a negative meniscus lens (G32) having a convex surface facing to the object side and a positive biconvex lens (G33) being aspherical on its surface on the image side. The fourth lens unit L4 is formed of a negative biconcave lens. The fifth lens unit L5 is formed of a negative biconcave lens. The sixth lens unit L6 is formed of a positive biconvex lens.

Next, an embodiment of an image pickup apparatus (a monitoring camera) using the zoom lens of the present invention as its image pickup optical system is described with reference to FIG. 13. Reference numerals in FIG. 13 are as follows: 10 denotes a monitoring camera body, 11 denotes an image pickup optical system which is any of the zoom lenses of Embodiments 1 to 6, 12 denotes an image pickup element (photoelectric conversion element), such as a CCD sensor or a CMOS sensor, configured to receive a subject image formed by the image pickup optical system 11, 13 denotes a memory that stores information constituting a subject image converted photoelectrically by the image pickup element 12, and 14 denotes a network cable used to transfer the subject image converted photoelectrically by the image pickup element 12.

As the image pickup apparatus, the present invention is not limited to a monitoring camera, and is also applicable to other devices such as a video camera or a digital camera.

The image pickup apparatus of the present invention may include, along with any of the zoom lenses described above, a correction circuit (correction means) (aberration correction means) for electrically correcting distortion and/or lateral chromatic aberration caused by the zoom lens. When the image pickup apparatus is thus configured to allow for distortion and lateral chromatic aberration of the zoom lens, the zoom lens needs fewer lenses, which contributes to size reduction of the entire system. The electric correction of lateral chromatic aberration facilitates reduction in chromatic blurring on an image picked up and thus improvement in resolving power.

The preferred embodiments of the present invention have been described above. The present invention is, however, not limited to these embodiments and can be variously modified and changed without departing from the gist of the invention.

Next, Numerical Data 1 to 6 corresponding respectively to Embodiments 1 to 6 of the present invention are demonstrated. In each numerical data, "i" represents the ordinal number of an optical surface from the object side, "ri" represents the radius of curvature of the i-th optical surface (or simply the i-th surface), "di" represents the interval between the i-th surface and the i+1 surface, and ndi and vdi respectively represent the refractive index and the Abbe number, for d-line, of a material of an optical member having the i-th surface.

"BF" represents a back focal length in air, which is a distance from the rearmost lens surface to a paraxial image plane. The overall lens length is a total distance of the back focal length BF and a distance from the first lens surface to the last lens surface. Aspherical surfaces have their surface numbers asterisked.

In addition, with "k" representing an eccentricity, "A4", "A6", "A8", "A10" representing aspherical coefficients, and "x" representing a displacement from the surface vertex along the optical axis at a height h from the optical axis, an aspherical shape is expressed as follows:

$$x=(h^2/R)/[1+\{1-(1+k)(h/R)^2\}^{1/2}]+A4h^4+A6h^6+A8h^8+A10h^{10}$$

where R is the paraxial radius of curvature.

Table 1 shows correspondences between Conditional Expressions (1) to (12) and Numerical Data 1 to 6. In Table 1, "G31", "G33", "G34", and "G35" denote the first, third, fourth, and fifth lenses of the third lens unit from the object side.

[Numerical Data 1]

[unit: mm]

Surface Data

| Surface No. i | ri | di | ndi | vdi | θgFi |
|---|---|---|---|---|---|
| 1 | 52.038 | 2.26 | 1.69680 | 55.5 | |
| 2 | 69.603 | (Variable) | | | |
| 3 | 47.670 | 1.30 | 1.91082 | 35.3 | |
| 4 | 13.090 | 7.61 | | | |
| 5 | 466.020 | 0.95 | 1.83481 | 42.7 | |
| 6 | 52.881 | 3.19 | | | |
| 7 | −34.709 | 0.80 | 1.59522 | 67.7 | |
| 8 | 26.743 | 2.62 | 1.95906 | 17.5 | |
| 9 | 124.179 | (Variable) | | | |
| 10(Stop) | ∞ | 1.00 | | | |
| 11* | 12.280 | 3.90 | 1.55332 | 71.7 | 0.5398 |
| 12* | −124.025 | 4.16 | | | |
| 13 | 22.367 | 0.50 | 1.80610 | 33.3 | |
| 14 | 11.899 | 1.17 | | | |
| 15 | 16.875 | 0.50 | 2.00069 | 25.5 | |
| 16 | 11.773 | 4.78 | 1.49710 | 81.6 | 0.5383 |
| 17* | −24.562 | 0.45 | | | |
| 18 | 10.407 | 2.50 | 1.59522 | 67.7 | 0.5442 |
| 19 | 27.247 | (Variable) | | | |
| 20* | −437.946 | 0.50 | 1.58313 | 59.4 | |
| 21* | 7.840 | (Variable) | | | |
| 22 | 39.802 | 1.89 | 1.59522 | 67.7 | |
| 23 | −20.199 | 4.01 | | | |
| 24 | ∞ | 1.99 | 1.51633 | 64.1 | |
| 25 | ∞ | 0.50 | | | |
| Image Plane | ∞ | | | | |

Aspheric Surface Data

11th Surface k = −3.21252e−001
A4 = −2.43022e−005
A6 = −4.09554e−008
A8 = −6.57816e−010
A10 = −4.37261e−012

12th Surface k = 0.00000e+000
A4 = 3.40354e−005
A6 = −3.53503e−008
A8 = −9.53608e−010

17th Surface k = 1.10167e+000
A4 = −2.56689e−006
A6 = 5.35569e−008
A8 = −7.34329e−010
A10 = 7.10741e−012

20th Surface k = −5.20135e+004
A4 = −1.16004e−004
A6 = 3.94426e−006
A8 = −3.02893e−007
A10 = 7.32199e−009

21th Surface k = 0.00000e+000
A4 = 7.34718e−005
A6 = −2.89091e−006

Various Data
Zoom Ratio 7.97

| | Wide Angle | Middle | Telephoto |
|---|---|---|---|
| Focal Length | 3.86 | 14.53 | 30.73 |
| F-NUMBER | 1.63 | 2.51 | 4.00 |
| Half Angle of View (degs.) | 61.2 | 16.7 | 8.04 |
| Image Height | 4.30 | 4.30 | 4.30 |
| Lens Total Length | 100.02 | 100.02 | 100.02 |
| BF | 5.82 | 5.82 | 5.82 |
| d2 | 0.60 | 26.32 | 16.38 |
| d9 | 48.61 | 10.48 | 1.80 |
| d19 | 1.78 | 4.70 | 7.19 |
| d21 | 2.46 | 11.94 | 28.07 |

Zooming lens unit Data

| Unit | Start Surface | Focal Length |
|---|---|---|
| 1 | 1 | 281.10 |
| 2 | 3 | −11.41 |
| 3 | 10 | 14.57 |
| 4 | 20 | −13.20 |
| 5 | 22 | 22.78 |

[Numerical Data 2]

[unit: mm]

Surface Data

| Surface No. i | ri | di | ndi | vdi | θgFi |
|---|---|---|---|---|---|
| 1 | 42.860 | 4.36 | 1.60311 | 60.6 | |
| 2 | 71.433 | (Variable) | | | |
| 3 | 44.163 | 1.30 | 1.85150 | 40.8 | |
| 4 | 14.618 | 8.17 | | | |
| 5 | 1031.570 | 0.95 | 1.80400 | 46.6 | |
| 6 | 39.093 | 3.49 | | | |
| 7 | −50.024 | 0.80 | 1.59522 | 67.7 | |
| 8 | 26.927 | 2.54 | 1.95906 | 17.5 | |
| 9 | 75.158 | (Variable) | | | |
| 10(Stop) | ∞ | 1.00 | | | |
| 11* | 11.978 | 5.21 | 1.55332 | 71.7 | 0.5398 |
| 12* | −80.936 | 2.68 | | | |
| 13 | 28.283 | 0.50 | 1.80610 | 33.3 | |
| 14 | 11.645 | 1.11 | | | |
| 15 | 16.198 | 0.50 | 2.00069 | 25.5 | |
| 16 | 12.302 | 6.37 | 1.55332 | 71.7 | 0.5398 |
| 17* | −30.391 | 0.54 | | | |
| 18 | 10.596 | 2.52 | 1.59522 | 67.7 | 0.5442 |
| 19 | 20.604 | (Variable) | | | |
| 20* | −14567.299 | 0.50 | 1.58313 | 59.4 | |
| 21* | 7.293 | (Variable) | | | |
| 22 | 31.334 | 2.25 | 1.60311 | 60.6 | |
| 23 | −17.897 | 3.54 | | | |
| 24 | ∞ | 1.99 | 1.51633 | 64.1 | |
| 25 | ∞ | 0.50 | | | |
| Image Plane | ∞ | | | | |

Aspheric Surface Data

11th Surface k = −2.75567e−001
A4 = −2.87828e−005
A6 = −9.54766e−008
A8 = 3.17602e−010
A10 = −1.31061e−011

12th Surface k = 0.00000e+000
A4 = 3.88153e−005
A6 = −4.33970e−008
A8 = −1.10005e−009

17th Surface k = 1.01430e+000
A4 = −8.36334e−006
A6 = 4.75254e−008
A8 = 1.36509e−009
A10 = −9.95755e−012

20th Surface k = 1.53352e+007
A4 = 1.72795e−004
A6 = −1.27453e−005
A8 = −1.76767e−007
A10 = 1.83430e−008

21st Surface k = 0.00000e+000
A4 = 3.56843e−004
A6 = −1.46894e−005
A8 = −1.46892e−007
A10 = 1.50997e−008

Various Data
Zoom Ratio 9.98

| | Wide Angle | Middle | Telephoto |
|---|---|---|---|
| Focal Length | 4.20 | 19.70 | 41.91 |
| F-NUMBER | 1.50 | 2.43 | 4.00 |
| Half Angle of View (degs.) | 52.7 | 12.3 | 5.96 |
| Image Height | 4.30 | 4.30 | 4.30 |
| Lens Total Length | 110.10 | 110.10 | 110.10 |
| BF | 5.35 | 5.35 | 5.35 |
| d2 | 0.60 | 30.43 | 19.54 |
| d9 | 54.38 | 11.09 | 1.80 |
| d19 | 1.83 | 5.46 | 8.93 |
| d21 | 2.47 | 12.28 | 28.99 |

Zooming lens unit Data

| Unit | Start Surface | Focal Length |
|---|---|---|
| 1 | 1 | 168.01 |
| 2 | 3 | −12.13 |
| 3 | 10 | 15.15 |
| 4 | 20 | −12.50 |
| 5 | 22 | 19.22 |

[Numerical Data 3]

[unit: mm]

Surface Data

| Surface No. i | ri | di | ndi | vdi | θgFi |
|---|---|---|---|---|---|
| 1 | 54.370 | 2.25 | 1.69680 | 55.5 | |
| 2 | 74.772 | (Variable) | | | |
| 3 | 38.088 | 1.30 | 1.91082 | 35.3 | |
| 4 | 11.869 | 7.81 | | | |
| 5 | −463.501 | 0.95 | 1.83481 | 42.7 | |
| 6 | 60.932 | 3.14 | | | |
| 7 | −26.416 | 0.80 | 1.59522 | 67.7 | |
| 8 | 43.335 | 2.28 | 1.95906 | 17.5 | |
| 9 | −196.227 | (Variable) | | | |
| 10(Stop) | ∞ | (Variable) | | | |
| 11* | 12.473 | 4.24 | 1.55332 | 71.7 | 0.5398 |
| 12* | −73.982 | 3.88 | | | |
| 13 | 22.017 | 0.50 | 1.83400 | 37.2 | |
| 14 | 11.988 | 0.90 | | | |
| 15 | 16.501 | 0.50 | 2.00069 | 25.5 | |
| 16 | 11.190 | 4.83 | 1.49710 | 81.6 | 0.5383 |
| 17* | −29.406 | 0.15 | | | |
| 18 | 10.793 | 2.77 | 1.53775 | 74.7 | 0.5392 |
| 19 | 51.831 | (Variable) | | | |
| 20* | −320.813 | 0.50 | 1.58313 | 59.4 | |
| 21* | 7.958 | (Variable) | | | |
| 22 | 85.369 | 1.78 | 1.59522 | 67.7 | |
| 23 | −17.226 | 3.54 | | | |
| 24 | ∞ | 1.99 | 1.51633 | 64.1 | |
| 25 | ∞ | 0.50 | | | |
| Image Plane | ∞ | | | | |

Aspheric Surface Data

11th Surface k = −3.08221e−001
A4 = −2.27857e−005
A6 = −5.09300e−008
A8 = −1.02497e−009
A10 = 4.89471e−013

12th Surface k = 0.00000e+000
A4 = 4.44122e−005
A6 = −1.52107e−007
A8 = −1.69322e−010

17th Surface k = 2.11872e+000
A4 = −2.09168e−005
A6 = 2.24321e−007

-continued

[unit: mm]

A8 = -2.91286e-009
A10 = 2.06505e-011
20th Surface k = 1.06798e+003
A4 = -1.56913e-004
A6 = 2.46927e-006
A8 = -7.24585e-008
A10 = 1.31505e-009
21th Surface k = 0.00000e+000
A4 = -1.65143e-005
A6 = -4.50230e-007

Various Data
Zoom Ratio 7.97

|  | Wide Angle | Middle | Telephoto |
| --- | --- | --- | --- |
| Focal Length | 3.88 | 14.36 | 30.93 |
| F-NUMBER | 1.65 | 2.59 | 4.00 |
| Half Angle of View (degs.) | 61.1 | 17.0 | 8.03 |
| Image Height | 4.30 | 4.30 | 4.30 |
| Lens Total Length | 100.03 | 100.03 | 100.03 |
| BF | 5.35 | 5.35 | 5.35 |
| d2 | 0.60 | 26.31 | 17.70 |
| d9 | 38.03 | 8.01 | 1.80 |
| d10 | 12.00 | 4.27 | 1.00 |
| d19 | 1.67 | 4.01 | 6.41 |
| d21 | 3.12 | 12.84 | 28.51 |

Zooming lens unit Data

| Unit | Start Surface | Focal Length |
| --- | --- | --- |
| 1 | 1 | 273.58 |
| 2 | 3 | -11.44 |
| 3 | 11 | 14.35 |
| 4 | 20 | -13.31 |
| 5 | 22 | 24.24 |

[Numerical Data 4]

[unit: mm]

Surface Data

| Surface No. i | ri | di | ndi | vdi | θgFi |
| --- | --- | --- | --- | --- | --- |
| 1* | 74.372 | 4.30 | 1.58313 | 59.4 | |
| 2* | 195.075 | (Variable) | | | |
| 3 | 31.070 | 1.30 | 2.00100 | 29.1 | |
| 4 | 12.816 | 6.50 | | | |
| 5 | 55.837 | 0.95 | 1.83481 | 42.7 | |
| 6 | 17.607 | 4.19 | | | |
| 7 | -53.938 | 0.80 | 1.59522 | 67.7 | |
| 8 | 17.381 | 2.73 | 1.95906 | 17.5 | |
| 9 | 46.379 | (Variable) | | | |
| 10(Stop) | ∞ | 1.00 | | | |
| 11* | 13.534 | 3.60 | 1.49710 | 81.6 | 0.5383 |
| 12* | -75.582 | 6.63 | | | |
| 13 | 18.370 | 0.50 | 2.00069 | 25.5 | |
| 14 | 10.623 | 5.11 | 1.49710 | 81.6 | 0.5383 |
| 15* | -34.783 | 0.15 | | | |
| 16 | 10.813 | 2.54 | 1.60311 | 60.6 | 0.5415 |
| 17 | 28.486 | (Variable) | | | |
| 18* | 47.770 | 0.50 | 1.76802 | 49.2 | |
| 19* | 7.428 | (Variable) | | | |
| 20 | 39.411 | 2.12 | 1.59522 | 67.7 | |
| 21 | -16.844 | 3.54 | | | |
| 22 | ∞ | 1.99 | 1.51633 | 64.1 | |
| 23 | ∞ | 0.50 | | | |
| Image Plane | ∞ | | | | |

Aspheric Surface Data

1st Surface k = -1.69717e+000
A4 = 5.29542e-006
A6 = -8.48213e-009
A8 = 1.08032e-011
A10 = -1.94115e-015
2nd Surface k = 0.00000e+000
A4 = 5.40434e-006
A6 = -1.45891e-008
A8 = 2.47254e-011
A10 = -1.41142e-014
11th Surface k = -3.53765e-001
A4 = -2.67039e-005
A6 = -8.76502e-008
A8 = -8.97303e-010
A10 = -9.98922e-012
12th Surface k = 0.00000e+000
A4 = 2.30996e-005
A6 = -1.45948e-008
A8 = -2.45838e-009
15th Surface k = -3.75337e+000
A4 = -5.86132e-006
A6 = -5.87535e-009
A8 = 3.06371e-009
A10 = -3.20509e-011
18th Surface k = -3.55459e+001
A4 = -3.74925e-005
A6 = -2.05436e-006
A8 = 7.41421e-010
A10 = 9.77184e-010
19th Surface k = 0.00000e+000
A4 = 1.27535e-004
A6 = -1.23364e-006

Various Data
Zoom Ratio 8.04

|  | Wide Angle | Middle | Telephoto |
| --- | --- | --- | --- |
| Focal Length | 3.58 | 12.94 | 28.78 |
| F-NUMBER | 1.65 | 2.49 | 4.00 |
| Half Angle of View (degs.) | 54.0 | 18.1 | 8.65 |
| Image Height | 4.30 | 4.30 | 4.30 |
| Lens Total Length | 97.04 | 97.04 | 97.04 |
| BF | 5.35 | 5.35 | 5.35 |
| d2 | 0.60 | 21.56 | 11.61 |
| d9 | 43.47 | 10.89 | 1.89 |
| d17 | 1.61 | 4.37 | 7.39 |
| d19 | 2.43 | 11.27 | 27.20 |

Zooming lens unit Data

| Unit | Start Surface | Focal Length |
| --- | --- | --- |
| 1 | 1 | 203.46 |
| 2 | 3 | -9.47 |

-continued

[unit: mm]

| | | |
|---|---|---|
| 3 | 10 | 13.85 |
| 4 | 18 | −11.51 |
| 5 | 20 | 20.11 |

[Numerical Data 5]

[unit: mm]

Surface Data

| Surface No. i | ri | di | ndi | vdi | θgFi |
|---|---|---|---|---|---|
| 1 | 26.770 | 2.94 | 1.69680 | 55.5 | |
| 2 | 30.156 | (Variable) | | | |
| 3 | 27.114 | 1.20 | 1.85150 | 40.8 | |
| 4 | 11.673 | 7.10 | | | |
| 5 | 99.479 | 0.90 | 1.83481 | 42.7 | |
| 6 | 13.621 | 5.06 | | | |
| 7 | −25.778 | 0.80 | 1.59522 | 67.7 | |
| 8 | 184.779 | 0.50 | | | |
| 9 | 30.360 | 1.84 | 1.95906 | 17.5 | |
| 10 | 136.420 | (Variable) | | | |
| 11* | 12.606 | 5.16 | 1.55332 | 71.7 | 0.5398 |
| 12* | −42.128 | 2.56 | | | |
| 13(Stop) | ∞ | 1.00 | | | |
| 14 | 14.863 | 0.50 | 2.00069 | 25.5 | |
| 15 | 8.670 | 3.91 | 1.49710 | 81.6 | 0.5383 |
| 16* | −17.442 | (Variable) | | | |
| 17 | −114.952 | 0.50 | 1.60311 | 60.6 | |
| 18 | 7.894 | (Variable) | | | |
| 19 | 19.095 | 3.23 | 1.49700 | 81.5 | |
| 20 | −17.800 | 4.74 | | | |
| 21 | ∞ | 1.99 | 1.51633 | 64.1 | |
| 22 | ∞ | 0.50 | | | |
| Image Plane | ∞ | | | | |

Aspheric Surface Data

11th Surface k = 1.88582e−001
A4 = −5.62415e−005
A6 = 1.97132e−007
A8 = −7.99231e−010
A10 = 5.49056e−011

12th Surface k = 0.00000e+000
A4 = 1.09531e−004
A6 = 3.87115e−007
A8 = 4.10847e−010
A10 = 8.94648e−011

16th Surface k = 1.66483e+000
A4 = 9.63946e−005
A6 = −4.21155e−007
A8 = 2.03346e−008
A10 = −2.23220e−010

Various Data
Zoom Ratio 4.99

| | Wide Angle | Middle | Telephoto |
|---|---|---|---|
| Focal Length | 3.82 | 11.61 | 19.07 |
| F-NUMBER | 1.65 | 2.59 | 3.68 |
| Half Angle of View (degs.) | 60.2 | 20.9 | 12.9 |
| Image Height | 4.30 | 4.30 | 4.30 |
| Lens Total Length | 89.15 | 89.15 | 89.15 |
| BF | 6.55 | 6.55 | 6.55 |
| d2 | 0.60 | 20.18 | 18.06 |
| d10 | 39.13 | 10.36 | 3.99 |

-continued

[unit: mm]

| | | | |
|---|---|---|---|
| d16 | 2.29 | 6.09 | 8.87 |
| d18 | 2.70 | 8.10 | 13.81 |

Zooming lens unit Data

| Unit | Start Surface | Focal Length |
|---|---|---|
| 1 | 1 | 252.20 |
| 2 | 3 | −9.25 |
| 3 | 11 | 13.15 |
| 4 | 17 | −12.23 |
| 5 | 19 | 19.09 |

[Numerical Data 6]

[unit: mm]

Surface Data

| Surface No. i | ri | di | ndi | vdi | θgFi |
|---|---|---|---|---|---|
| 1 | 44.790 | 5.01 | 1.60311 | 60.6 | |
| 2 | 88.205 | (Variable) | | | |
| 3 | 45.509 | 1.20 | 1.85150 | 40.8 | |
| 4 | 10.521 | 6.56 | | | |
| 5 | 65.472 | 0.90 | 1.77250 | 49.6 | |
| 6 | 18.690 | 4.74 | | | |
| 7 | −18.602 | 0.80 | 1.59522 | 67.7 | |
| 8 | −137.681 | 0.15 | | | |
| 9 | 42.159 | 1.92 | 1.92286 | 18.9 | |
| 10 | −242.367 | (Variable) | | | |
| 11* | 11.959 | 4.30 | 1.55332 | 71.7 | 0.5398 |
| 12* | −28.531 | 2.03 | | | |
| 13(Stop) | ∞ | 1.39 | | | |
| 14 | 14.433 | 0.50 | 2.00069 | 25.5 | |
| 15 | 7.766 | 4.46 | 1.49710 | 81.6 | 0.5383 |
| 16* | −16.473 | (Variable) | | | |
| 17 | 240.359 | 0.50 | 1.49700 | 81.5 | |
| 18 | 6.452 | (Variable) | | | |
| 19 | −30.000 | 0.50 | 1.49700 | 81.5 | |
| 20 | 50.000 | (Variable) | | | |
| 21 | 17.090 | 2.71 | 1.59522 | 67.7 | |
| 22 | −18.580 | 3.04 | | | |
| 23 | ∞ | 1.99 | 1.51633 | 64.1 | |
| 24 | ∞ | 0.50 | | | |
| Image Plane | ∞ | | | | |

Aspheric Surface Data

11th Surface k = 4.10535e−002
A4 = −6.81622e−005
A6 = −7.56211e−007
A8 = 1.57624e−008
A10 = −1.43358e−010

12th Surface k = 0.00000e+000
A4 = 1.19898e−004
A6 = −1.07739e−006
A8 = 2.20808e−008
A10 = −1.73640e−010

16th Surface k = 1.58083e+000
A4 = 1.14026e−004
A6 = 5.30962e−007
A8 = −1.70318e−008
A10 = 2.45225e−010

-continued

[unit: mm]

Various Data
Zoom Ratio 6.93

|  | Wide Angle | Middle | Telephoto |
|---|---|---|---|
| Focal Length | 3.95 | 14.75 | 27.38 |
| F-NUMBER | 1.65 | 2.59 | 4.00 |
| Half Angle of View (degs.) | 58.2 | 16.4 | 8.98 |
| Image Height | 4.30 | 4.30 | 4.30 |
| Lens Total Length | 90.05 | 90.05 | 90.05 |
| BF | 4.85 | 4.85 | 4.85 |
| d2 | 0.60 | 24.37 | 22.48 |
| d10 | 40.61 | 8.25 | 0.84 |
| d16 | 1.50 | 5.26 | 8.17 |
| d18 | 3.14 | 1.98 | 4.43 |
| d20 | 1.00 | 6.98 | 10.92 |

Zooming lens unit Data

| Unit | Start Surface | Focal Length |
|---|---|---|
| 1 | 1 | 144.60 |
| 2 | 3 | −9.66 |
| 3 | 11 | 12.38 |
| 4 | 17 | −13.35 |
| 5 | 19 | −37.65 |
| 6 | 21 | 15.39 |

TABLE 1

| Conditional Expression | | Embodiment | | | | | |
|---|---|---|---|---|---|---|---|
| | | 1 | 2 | 3 | 4 | 5 | 6 |
| (1) | | 0.47 | 0.45 | 0.48 | 0.45 | 0.74 | 0.69 |
| (2) | | −0.52 | −0.47 | −0.52 | −0.46 | −1.10 | −1.19 |
| (3) | | 6.93 | 4.00 | 6.33 | 2.23 | 16.81 | 3.06 |
| (4) | | 124.5 | 38.5 | 121.6 | 47.4 | 85.8 | 28.8 |
| (5) | | 1.70 | 1.60 | 1.70 | 1.58 | 1.70 | 1.60 |
| (6) | | 55.5 | 60.6 | 55.5 | 59.4 | 55.5 | 60.6 |
| (7) | | −2.96 | −2.89 | −2.95 | −2.64 | −2.42 | −2.44 |
| (8) | | 1.96 | 1.96 | 1.96 | 1.96 | 1.96 | 1.92 |
| (9) | | 17.5 | 17.5 | 17.5 | 17.5 | 17.5 | 18.9 |
| (10) | | 73.7 | 70.4 | 76.0 | 74.6 | 76.6 | 76.6 |
| (11) | G31 | 0.016 | 0.016 | 0.016 | 0.031 | 0.016 | 0.016 |
| | G33 | — | — | — | 0.031 | 0.031 | 0.031 |
| | G34 | 0.031 | 0.016 | 0.031 | −0.001 | — | — |
| | G35 | 0.01 | 0.01 | 0.02 | — | — | — |
| (12) | | 0.84 | 0.71 | 0.83 | 0.73 | 1.03 | 0.87 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-223150, filed Nov. 13, 2015, which is hereby incorporated by reference herein in its entirety.

What is claimed is:

1. A zoom lens comprising, in order from an object side to an image side:
a first lens unit having a positive refractive power;
a second lens unit having a negative refractive power;
a third lens unit having a positive refractive power;
a fourth lens unit having a negative refractive power; and
a rear lens group including at least one lens unit, wherein
the first lens unit does not move for zooming, during zooming from a wide angle end to a telephoto end, each of the third lens unit and the fourth lens unit moves toward the object side, and an interval between each adjacent two of the lens units varies, and
the zoom lens satisfies the following conditional expressions:

$$0.1 < f3/|m3| < 0.9,$$

$$-1.4 < f4/|m4| < -0.1, \text{ and}$$

$$1.5 < (R2a + R1a)/(R2a - R1a) < 30.0,$$

where f3 is a focal length of the third lens unit, f4 is a focal length of the fourth lens unit, m3 is an amount of displacement of the third lens unit in the zooming from the wide angle end to the telephoto end, m4 is an amount of displacement of the fourth lens unit in the zooming from the wide angle end to the telephoto end, R1a is a radius of curvature of a lens surface nearest to the object side in the first lens unit, and R2a is a radius of curvature of a lens surface nearest to the image side in the first lens unit.

2. The zoom lens according to claim 1, wherein the zoom lens satisfies the following conditional expression:

$$20.0 < f1/D1 < 200.0,$$

where f1 is a focal length of the first lens unit L1, and D1 is a thickness of the first lens unit on an optical axis.

3. The zoom lens according to claim 1, wherein the first lens unit consists of a single positive lens, and the zoom lens satisfies the following conditional expressions:

$$1.50 < nd11a < 1.80, \text{ and}$$

$$45.0 < vd11a < 75.0,$$

where nd11a and vd11a are respectively a refractive index and an Abbe number of a material of the positive lens of the first lens unit.

4. The zoom lens according to claim 1, wherein the zoom lens satisfies the following conditional expression:

$$-3.6 < f2/fw < -2.0,$$

where f2 is a focal length of the second lens unit, and fw is a focal length of the zoom lens at the wide angle end.

5. The zoom lens according to claim 1, wherein the second lens unit includes, in order from the object side to the image side, a negative lens, a negative lens, a negative lens, and a positive lens, and the zoom lens satisfies the following conditional expressions:

$$1.85 < nd24a < 2.00, \text{ and}$$

$$14.0 < vd24a < 22.0,$$

where nd24a and vd24a are respectively a refractive index and an Abbe number of a material of the positive lens of the second lens unit.

6. The zoom lens according to claim 1, wherein the third lens unit includes a plurality of positive lenses, and the zoom lens satisfies the following conditional expression:

$$65.0 < vd3a,$$

where vd3a is an average Abbe number of materials of the positive lenses in the third lens unit.

7. The zoom lens according to claim 1, wherein
the third lens unit includes a plurality of positive lenses, and
at least two of the positive lenses of the third lens unit are formed from a material satisfying the following conditional expression:

$$0.010 < \theta gF - (0.644 - 0.00168 \times vd) < 0.070,$$

where vd is an Abbe number of the material, and θgF is a partial dispersion ratio of the material.

8. The zoom lens according to claim 1, wherein
during zooming from the wide angle end to the telephoto end, the second lens unit moves toward the image side and then toward the object side, and
the zoom lens satisfies the following conditional expression:

$$0.5 < m2/ft < 1.3,$$

where m2 is a distance between positions of the second lens unit on an optical axis during the zooming from the wide angle end to the telephoto end, one of the positions being closest to the object and the other position being closest to the image, and ft is a focal length of the zoom lens at the telephoto end.

9. The zoom lens according to claim 1, wherein
the fourth lens unit moves toward the image side to focus from infinity to close-up.

10. The zoom lens according to claim 1, wherein
the rear lens group consists of a fifth lens unit having a positive refractive power.

11. The zoom lens according to claim 1, wherein
the rear lens group consists of, in order from the object side to the image side, a fifth lens unit having a negative refractive power and a sixth lens unit having a positive refractive power.

12. An image pickup apparatus, comprising:
the zoom lens according to claim 1; and
an image pickup element configured to receive an image formed by the zoom lens.

13. A zoom lens comprising, in order from an object side to an image side:
a first lens unit having a positive refractive power;
a second lens unit having a negative refractive power;
a third lens unit having a positive refractive power;
a fourth lens unit having a negative refractive power; and
a rear group including at least one lens unit, wherein
the first lens unit does not move for zooming,
each of the third lens unit and the fourth lens unit moves toward the object side during zooming from a wide angle end to a telephoto end, thereby varying an interval between each adjacent two of the lens units during the zooming,
the third lens unit includes a plurality of positive lenses, and
the zoom lens satisfies the following conditional expressions:

$$0.1 < f3/|m3| < 0.9,$$

$$-1.4 < f4/|m4| < -0.1, \text{ and}$$

$$1.5 < (R2a + R1a)/(R2a - R1a) < 30.0,$$

where f3 is a focal length of the third lens unit, f4 is a focal length of the fourth lens unit, m3 is an amount of displacement of the third lens unit in the zooming from the wide angle end to the telephoto end, m4 is an amount of displacement of the fourth lens unit in the zooming from the wide angle end to the telephoto end, R1a is a radius of curvature of a lens surface nearest to the object side in the first lens unit, and R2a is a radius of curvature of a lens surface nearest to the image side in the first lens unit, and
wherein at least two of the positive lenses of the third lens unit are formed from a material satisfying the following conditional expression:

$$0.010 < \theta gF - (0.644 - 0.00168 \times vd) < 0.070,$$

where vd is an Abbe number of the material, and θgF is a partial dispersion ratio of the material.

14. A zoom lens comprising, in order from an object side to an image side:
a first lens unit having a positive refractive power;
a second lens unit having a negative refractive power;
a third lens unit having a positive refractive power;
a fourth lens unit having a negative refractive power; and
a rear group including at least one lens unit, wherein
the first lens unit does not move for zooming,
each of the third lens unit and the fourth lens unit moves toward the object side during zooming from a wide angle end to a telephoto end, thereby varying an interval between each adjacent two of the lens units during the zooming, and
the zoom lens satisfies the following conditional expressions:

$$0.1 < f3/|m3| < 0.9,$$

$$-1.4 < f4/|m4| < -0.1,$$

$$1.5 < (R2a + R1a)/(R2a - R1a) < 30.0, \text{ and}$$

$$0.5 < m2/ft < 1.3,$$

where f3 is a focal length of the third lens unit, f4 is a focal length of the fourth lens unit, m3 is an amount of displacement of the third lens unit in the zooming from the wide angle end to the telephoto end, m4 is an amount of displacement of the fourth lens unit in the zooming from the wide angle end to the telephoto end, R1a is a radius of curvature of a lens surface nearest to the object side in the first lens unit, R2a is a radius of curvature of a lens surface nearest to the image side in the first lens unit, m2 is a distance between positions of the second lens unit on an optical axis during the zooming from the wide angle end to the telephoto end, one of the positions being closest to the object and the other position being closest to the image, and ft is a focal length of the zoom lens at the telephoto end.

* * * * *